US012062952B2

(12) United States Patent
Grosskreuz et al.

(10) Patent No.: US 12,062,952 B2
(45) Date of Patent: Aug. 13, 2024

(54) TRACK CONNECTION MODULE FOR LINEAR MOTOR TRACKS

(71) Applicant: Rockwell Automation Technologies, Inc., Mayfield Heights, OH (US)

(72) Inventors: Paul J. Grosskreuz, Newburg, WI (US); Shankernarayan Ramanarayanan, Eden Prairie, MN (US); Rui Zhou, West Bend, WI (US); Juan A Fernandez, Thiensville, WI (US); Oliver C. Haya, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 424 days.

(21) Appl. No.: 17/534,855

(22) Filed: Nov. 24, 2021

(65) Prior Publication Data
US 2022/0085700 A1 Mar. 17, 2022

Related U.S. Application Data

(63) Continuation of application No. 16/189,774, filed on Nov. 13, 2018, now Pat. No. 11,190,086.

(51) Int. Cl.
*H02K 11/33* (2016.01)
*B65G 54/02* (2006.01)
(Continued)

(52) U.S. Cl.
CPC ............. *H02K 11/33* (2016.01); *B65G 54/02* (2013.01); *H02K 41/033* (2013.01); *B61B 13/04* (2013.01);
(Continued)

(58) Field of Classification Search
CPC .. H02K 11/33; H02K 41/033; H02K 2213/12; H02K 41/031; B65G 54/02; B65G 2203/0283; B65G 2203/043; B61B 13/04
See application file for complete search history.

(56) References Cited

U.S. PATENT DOCUMENTS 3,287,616 A 11/1966 Mcneil
4,140,063 A 2/1979 Nakamura
(Continued)

FOREIGN PATENT DOCUMENTS

JP 2004023954 A 1/2004
WO 2018055720 A1 3/2018
WO 2018192721 A1 10/2018

OTHER PUBLICATIONS

Extended European Search Report for Application No. 19208817.7 mailed Apr. 3, 2020, 7 pages.
(Continued)

*Primary Examiner* — Mohamad A Musleh
(74) *Attorney, Agent, or Firm* — Fletcher Yoder, P.C.

(57) ABSTRACT

A linear motor system may include a plurality of track sections that may enable a mover to traverse a track formed by the plurality of track sections. The system may also include a plurality of connection modules, such that each connection module of the plurality of connection modules may physically couple two respective adjacent track sections of the plurality of track sections and communicatively couple the two respective adjacent track sections of the plurality of track section. Each connection module may also electrically couple the two respective adjacent track sections of the plurality of track section.

20 Claims, 18 Drawing Sheets

(51) Int. Cl.
*H02K 41/03* (2006.01)
*B61B 13/04* (2006.01)
(52) U.S. Cl.
CPC ............... *B65G 2203/0283* (2013.01); *B65G 2203/043* (2013.01); *H02K 2213/12* (2013.01)

(56) References Cited

U.S. PATENT DOCUMENTS

| | | | |
|---|---|---|---|
| 5,134,324 | A | 7/1992 | Sakagami et al. |
| 5,180,048 | A | 1/1993 | Kawada et al. |
| 10,164,555 | B1* | 12/2018 | Ozimek .............. H02M 7/5395 |
| 2008/0011184 | A1* | 1/2008 | Lopatinsky ............. B60L 13/03 |
| | | | 104/282 |
| 2014/0331888 | A1* | 11/2014 | Wernersbach ........ B60L 13/006 |
| | | | 104/282 |
| 2015/0344233 | A1 | 12/2015 | Kleinikkink et al. |
| 2017/0346379 | A1 | 11/2017 | Weber et al. |
| 2018/0073912 | A1 | 3/2018 | Lyman et al. |
| 2018/0090254 | A1* | 3/2018 | Ozimek ................... H02P 5/00 |
| 2019/0202639 | A1 | 7/2019 | Mukai |

OTHER PUBLICATIONS

Communication pursuant to Article 94(3) for Application No. 19208817.7 mailed Jun. 30, 2023, 5 pages.
Communication pursuant to Article 94(3) for Application No. 19208817.7 mailed Apr. 30, 2024, 4 pages.

* cited by examiner

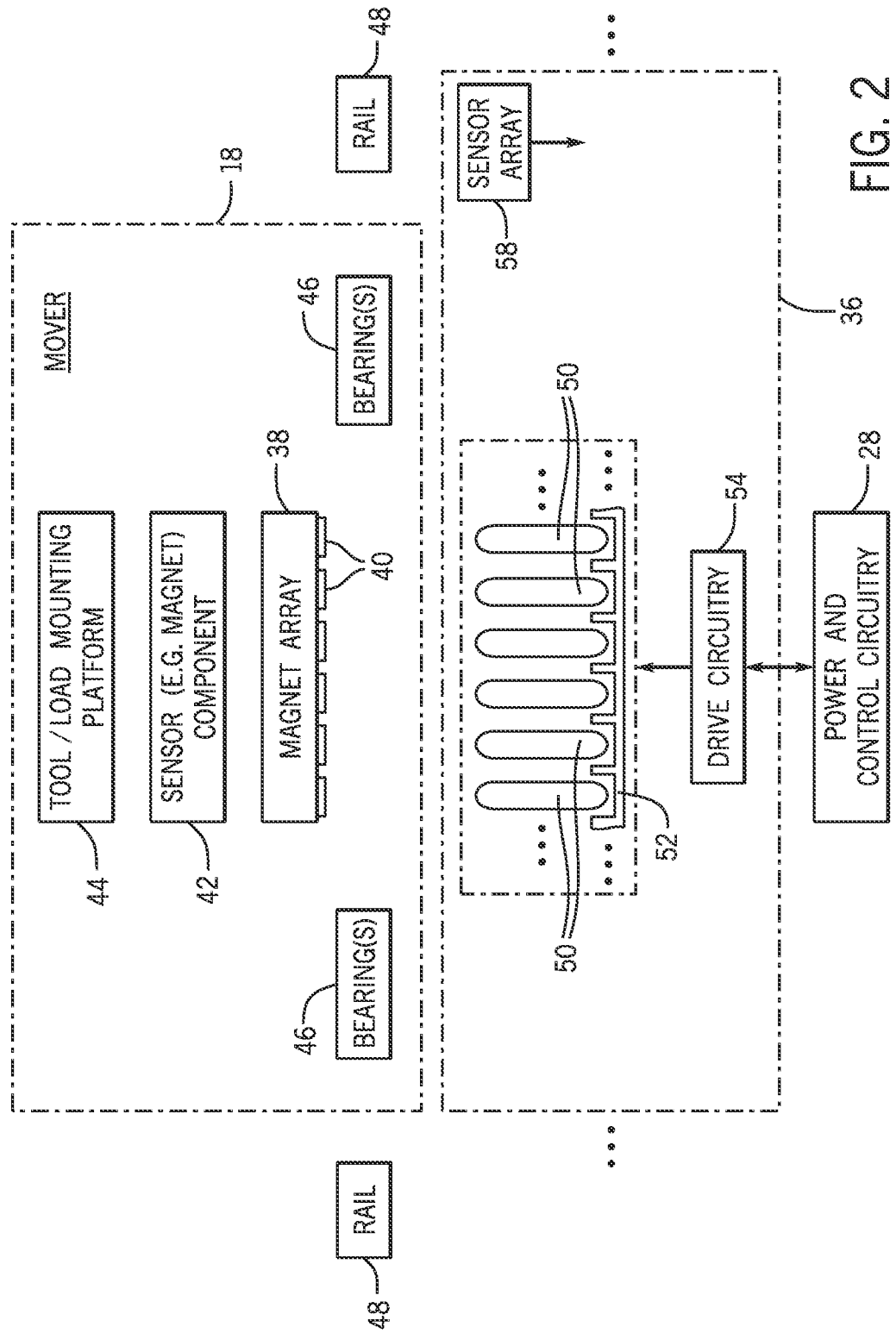

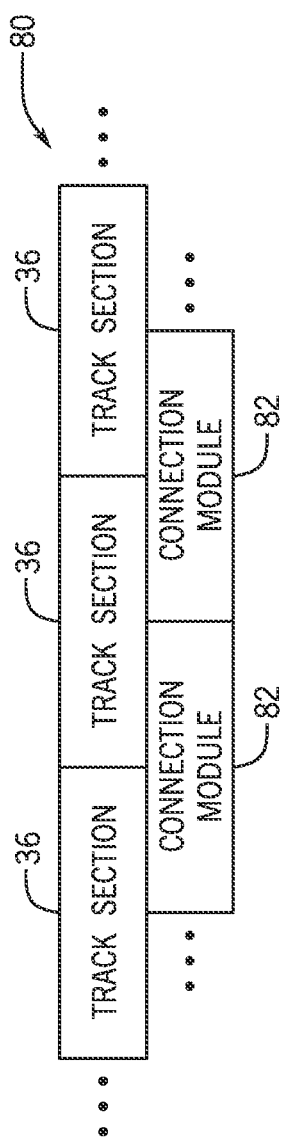
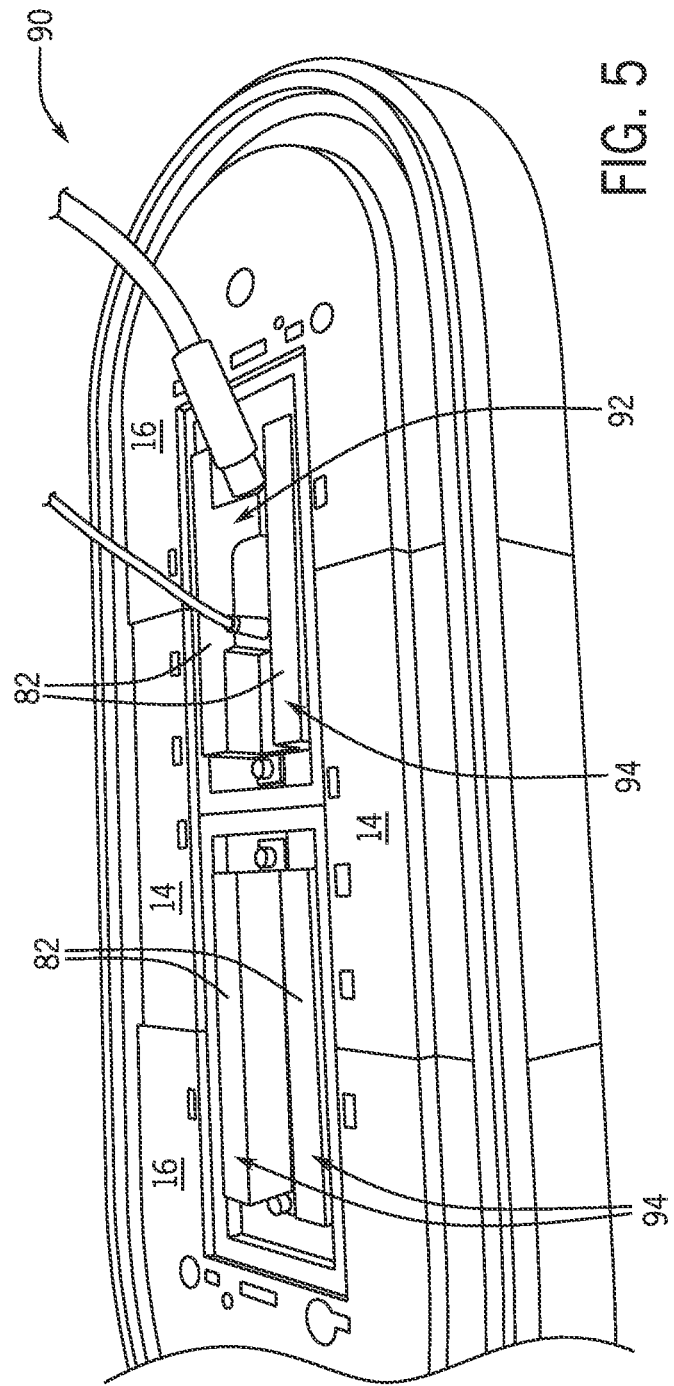

TRACK CONNECTION MODULE FOR LINEAR MOTOR TRACKS

CROSS-REFERENCE TO RELATED APPLICATIONS

This application is a continuation of U.S. application Ser. No. 16/189,774, entitled "TRACK CONNECTION MODULE FOR LINEAR MOTOR TRACKS," filed Nov. 13, 2018, which is hereby incorporated by reference in its entirety for all purposes.

BACKGROUND

The present disclosure relates generally to linear motor systems having connection modules, and more particularly, to connection modules that facilitate the operation of the linear motor system.

A range of linear motors are known and in use throughout industry, particularly in manufacturing, filling, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Because available track sections may need to be designed for a wide range of applications, orientations, and path layouts, they are typically made modular. Currently available tracks include either straight sections or curved sections, and these are typically joined end-to-end to provide the desired transport path for the movers. At turns or curves, modular curved sections may be joined to form various angles, such as 45 degrees, 90 degrees, and 180 degrees. Following a desired change in direction, then, the ends of the curved sections are joined with modular straight sections to continue the desired layout.

Each modular track section may connect to each other to form various shapes and pathways. To enable movers on the modular track sections to glide or move across the track section, each track section receives power from a power supply external to the track sections. In addition, each track section may also communicate data between each section using certain communication protocols. In some instances, power and communication channels are provided to the modular track sections via wires and cables between each track section. However, installing the cables and maintaining the connection between track section using cables may become a difficult task as the collections of track sections become larger. With this in mind, improved systems and methods for enabling the modular track section to receive power and data via a communication channel are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a linear motor system may include a plurality of track sections that may enable a mover to traverse a track formed by the plurality of track sections. The system may also include a plurality of connection modules, such that each connection module of the plurality of connection modules may physically couple two respective adjacent track sections of the plurality of track sections and communicatively couple the two respective adjacent track sections of the plurality of track section. Each connection module may also electrically couple the two respective adjacent track sections of the plurality of track section.

In another embodiment, a system, may include a plurality of track sections that may enable a mover to traverse a track formed by the plurality of track sections. The system may also include a plurality of connection modules, such that each connection module of the plurality of connection modules may couple to two adjacent track sections of the plurality of track sections. The plurality of connection modules may a first connection module that may receive power from an external power source and communicatively couple to an external device. The plurality of connection modules may also include a second connection module that may communicatively couple a pair of adjacent track sections of the plurality of track sections and electrically couple the pair of adjacent track sections.

In yet another embodiment, a linear motor system may include a plurality of track sections that may enable a mover to traverse a track formed by the plurality of track sections. The linear motor system may also include a plurality of connection modules, such that each connection module of the plurality of connection modules may couple to two adjacent track sections of the plurality of track sections. The plurality of connection modules may include a first connection module that may receive power from an external power source and communicatively couple to an external device. The plurality of connection modules may also include a second connection module that may communicatively couple a pair of adjacent track sections of the plurality of track sections and electrically couple the pair of adjacent track sections. The second connection module may also include a third connection module configured to receive additional power from an additional power source

DRAWINGS

These and other features, aspects, and advantages of the present disclosure will become better understood when the following detailed description is read with reference to the accompanying drawings in which like characters represent like parts throughout the drawings, wherein:

FIG. 2 is a diagrammatical representation of the system of FIGS. 1A and 1B, in accordance with embodiments described herein;

FIG. 4 is a block diagram of a linear motor system that includes track sections coupled to track connection modules, in accordance with embodiments described herein;

FIG. 5 is an example representation of the track sections coupled to the track connection modules, in accordance with embodiments described herein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1A:
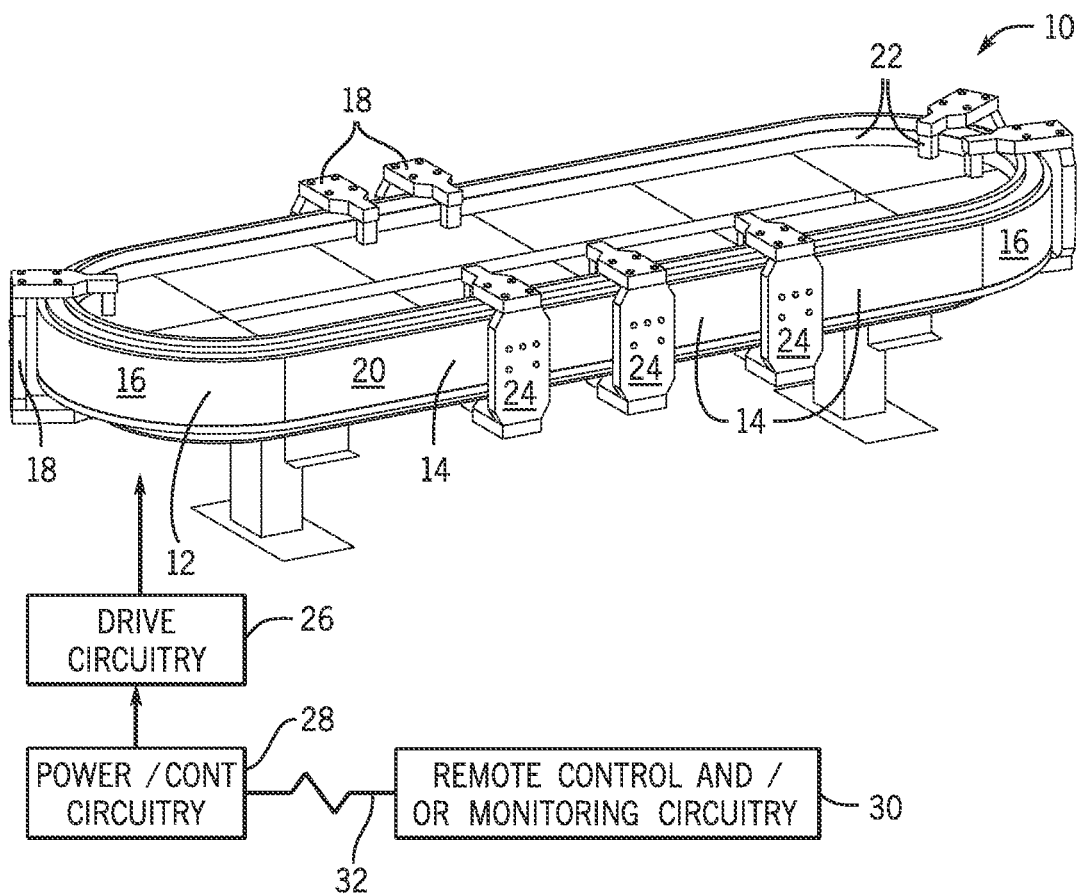
FIG. 1A is a perspective view of an exemplary linear motor system illustrating straight and curved track modules and several movers positioned for movement along the modules, in accordance with embodiments described herein.

Turning now to the drawings, and referring first to FIG. 1A, a linear motor system 10 as illustrated for moving articles or products around a track 12. As will be appreciated by those skilled in the art, in many applications, the linear motor system 10 may inter-operate with other machines, robots, conveyers, control equipment, and so forth (not separately shown) in an overall automation, packaging, material handling or other application. The linear motor system 10 may generally be referred to a "linear motor" as discussed below, in which the moving components are positioned, accelerated, decelerated, and generally moved under the influence of controlled magnetic and electromagnetic fields. In the illustrated embodiment, the track 12 comprises straight track sections 14 and curved track sections 16. These sections may be generally self-contained and mountable in various physical configurations, such as the oval illustrated in FIG. 1A. It should be noted that other configurations are equally possible as discussed below. The configurations may form closed loops of various shapes, but may also include open-ended segments. The linear motor system 10 may also include one or more movers 18, which may be mounted to and movable along the track. Again, the position, velocity, acceleration, and higher order derivative parameters are controllable for these movers 18 by appropriate control of the coils of the system that are energized and de-energized. In the illustrated embodiment, the movers 18 interact with stationary elements in and around an outer periphery 20 of the track sections, although other configurations are envisaged. A sensor system 22 is provided to detect positions of the movers 18 around the track 12, and such center systems may include permanent magnets, energized coils, Hall effect sensors, or any other suitable devices. In general, one component of the sensor system 22 may be mounted on the movers 18, while another component will be mounted at fixed locations around the track.

Each mover 18 may include a mounting platform 24. In an actual implementation, various tools, holders, support structures, loads, and so forth may be mounted to this mounting platform. The movers 18 themselves may be configured differently from those shown in order accommodate the various loads. While a horizontal configuration is illustrated in FIG. 1A, other orientations may also be provided, such as ones in which the illustrated oval is generally stood on a side or end, or at any angle between.

The linear motor system 10 may also include circuitry for controlling a movement of the movers. In the embodiment illustrated in FIG. 1A, this circuitry may include drive circuitry 26 that provides signals to each track section, and specifically individual coils of the track sections to create electromotive forces that interact with magnets on the track sections to drive the movers 18 to specific locations, and at specific velocity, accelerations, and so forth. This drive circuitry 26 may typically include inverter circuitry that makes use of power electronic switches to provide drive power to the individual coils of each module in a controlled manner. In some embodiments, the drive circuitry 26 may be included in each individual track section, and signals provided to the drive circuitry 26 by power and control circuitry 28. This power and control circuitry 28 (and the drive circuitry 26) may receive feedback from the movers 18 and/or from the sensor system 22 to detect the location, velocity, acceleration, and so forth of each mover. In certain embodiments the movers 18 may also be recognized by the power and control circuitry 28 as individual axes that are independently controlled, but with regulation of their position, velocity and acceleration to avoid conflicts, collisions, and so forth. The particular motion profile implemented by the power and control circuitry 28 may typically be implemented upon the design and commissioning of the linear motor system 10, here again, depending upon the particular task to be performed. Finally, various remote control and/or monitoring circuitry 30 may be provided and may be linked to the linear motor system 10 by one or more networks 32. Such remote circuitry may generally allow for coordination of the operation of the linear motor system 10 with other automation components, machine systems, manufacturing and material handling machines, and so forth.

Figure 1B:
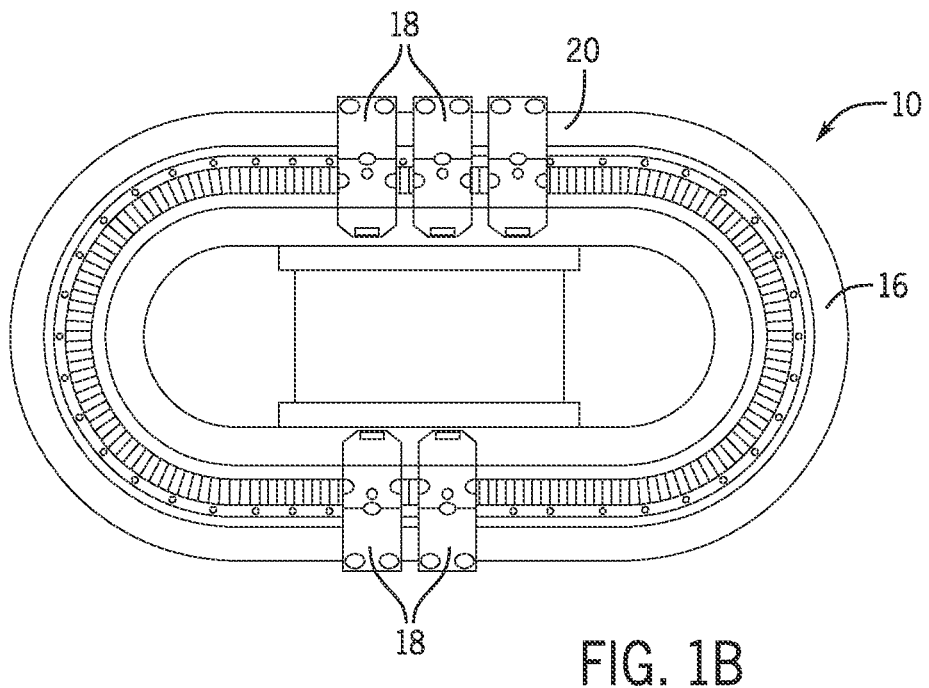
FIG. 1B is a top view of a similar linear motor system in which motor coils are positioned differently than in the system of FIG. 1A, in accordance with embodiments described herein.

FIG. 1B illustrates an alternative configuration for a similar linear motor system 10. However, in this configuration, rather than motor coils being positioned around the periphery of the system, coils are positioned around the top of the system, in a generally planar arrangement. Magnet assemblies of each mover 18 face these coils and are spaced from the coils by a small air gap. Straight and curved track modules are assembled, as above, to form an oval, although other shapes and layouts may be formed. The curved track modules may be adapted with modified spline geometries, as in the case of the system shown in FIG. 1A, and as described in greater detail below.

FIG. 2 is a diagrammatical representation of the linear motor system 10 showing one track section 36 and one mover 18 positioned along the track section 36. The track section illustrated in FIG. 2 may be a straight or curved track section, these two differing in their physical configuration, and certain of the actual characteristics owing to the curved nature of the curved sections as discussed below. In general, however, each mover 18 may include a magnet array 38 on which a number of magnets 40 may be mounted. These magnets 40 may be permanent magnets and are mounted such that a small air gap is provided between the magnets 40 and coils of the track section 36. As shown in FIG. 2, the mover 18 may also include a sensor component 42, such as a permanent magnet. It should be noted, however, that the particular sensor component included in the mover 18 may depend upon the nature of the sensing strategy, the sensing resolution, the position of the sensor on the mover (and cooperating components on the track module), and so forth. The platform 44 is provided on the mover 18 for mounting tools and the like as discussed above. Finally, bearings 46 and associated components (e.g., rollers) are mounted to the mechanical structure of the mover 18 and may serve to interact with one or more rails 48. These bearings 46 and rails 48 may allow the mover 18 to remain securely attached to the track section 36 while allowing relatively free movement of the movers 18 along the track section 36 and supporting mechanical loads and forces encountered during motion.

The track module 36 may include a series of parallel coils 50 that are associated with a stator or armature 52. In currently contemplated embodiments, these coils 50 may be mounted into slots in the stator, and the stator itself may be made of magnetic material formed into a stack of laminates and structured to allow for mounting within the track section housing. Particular configurations, magnetic, mounting structures and the like of the coils and stator components are generally beyond the scope of the present disclosure. Drive circuitry 54 may be included in each module as discussed above to allow for controlled power signals to be applied to the coils in order to drive and position the movers appropriately around the track module. Finally, a sensor array 56 is provided in each track section to allow for interaction with the sensor components of the movers. This sensor array 58 may provide feedback that can indicate the position of the movers, and can be used to derive velocity, acceleration, jerk and other motion parameters. In the illustrated embodiment, a number of track sections may be mounted end-to-end and interconnected with one another and/or with the power and control circuitry 28 to received signals used to power the coils.

As will be appreciated by those skilled in the art, track sections, along with the magnet arrays of the movers, may generally form what may be considered the linear motor system 10. That is, electromotor force is generated by the controlled fields of the coils and interaction between these fields and the magnetic fields of the magnet array serve to drive the mover into desired positions, at desired speeds, and so forth. As noted above, these coils and the linear motor itself may be designed in accordance with various configuration strategies, such as ones having the coils arranged around a periphery of the track modules, ones in which the coils are generally planar (in a top or bottom position of the modules), and so forth. Although the "linear" motor system may be used in the present disclosure, it should be appreciated that curved modules in various configurations are intended to be included under this rubric.

Figure 3A:
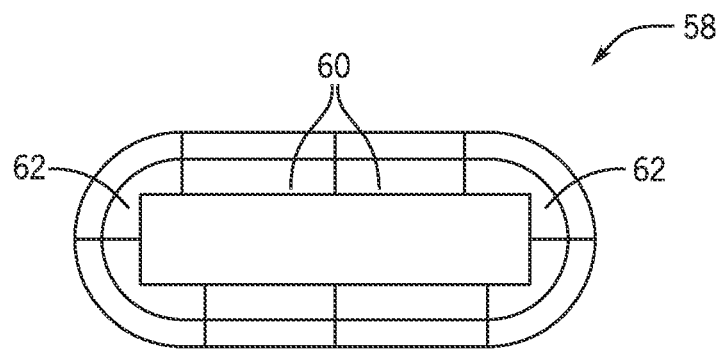
FIGS. 3A-3C are diagrammatical representations of different track configurations that may be developed based upon curved track sections according to the present disclosure, in accordance with embodiments described herein.
Figure 3B:
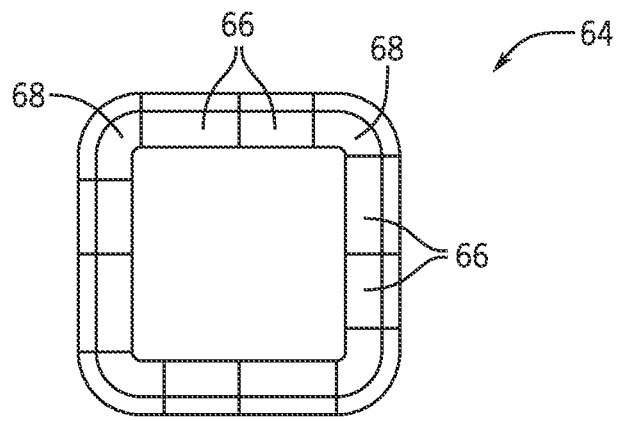
Figure 3C:
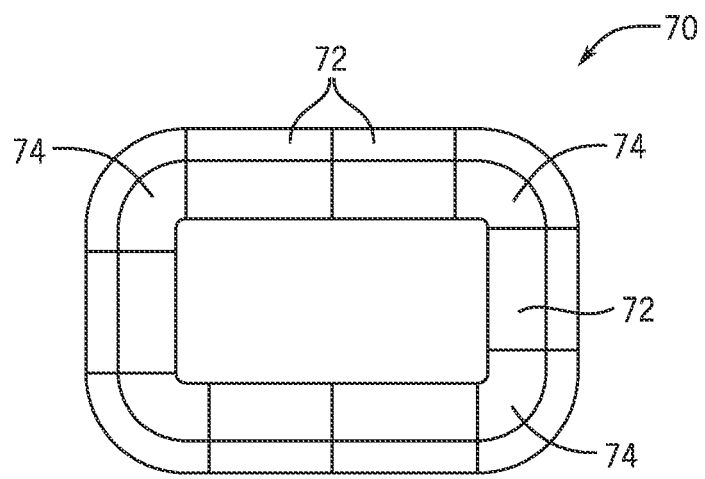

In addition to the configurations shown in FIGS. 1A and 1B, various other physical layouts may be employed, such as those shown in FIGS. 3A, 3B and 3C. FIG. 3A illustrates a linear motor system having an oval configuration 58. Here the configuration is made of several straight track sections 60 and end track sections 62 that form 180-degree curves. Any number of straight sections may be provided, and as described more fully below, the curved section may be provided in a single unit forming 180 degrees to close the oval or in smaller units of 90 degrees, 45 degrees, 30 degrees, and so forth. As shown in FIG. 3B, square configurations 64 may be similarly formed by insertion of straight sections 66 between 90-degree sections 68. In the rectangular configuration 70 of FIG. 3C, straight sections 72 are inserted between 90-degree modules 74, with a different number of straight modules on each side to form a generally rectangular configuration. Other configurations may include various turns, interior and exterior curves, S-shapes, open-ended track sections, and so forth.

It should also be noted that a number of different coil and magnet configurations may be employed with the innovations summarized in the present disclosure. These may include, for example, the peripheral coil and facing magnet arrangements discussed above, and the generally planar coil arrangements with facing magnet arrangements also discussed above. Other arrangements may include opposing coils and/or magnets, with the cooperating magnets/coils in facing relation, T-shaped magnet and/or coil structures, and so forth.

With the foregoing in mind, to enable the track sections 36 described above to operate, each track section 36 may communicate with other track sections 36 of the linear motor system 10. That is, as the mover 18 traverses across different track sections, data related to the position, speed, and other properties of the mover 18 may be useful to monitor by the remote control and/or monitoring circuitry 30 or the like. However, providing provisions to couple the remote control and/or monitoring circuitry 30 to each track section 36 may involve a complex network of wiring and communication links. Instead, as will be described in greater detail below, track connection modules 82 may provide the circuitry and components that enable each track section 36 to communicate data with each other. In addition, the connection module 82 may also provide a communication link to the remote control and/or monitoring circuitry 30 to enable remote control and/or monitoring of the linear motor system 10.

In addition to communicating data across the track connection modules 82, in certain embodiments, the track connection modules 83 may also include circuitry that allows for power (e.g., voltage) to be shared across track sections 36. That is, the power and control circuitry 28 may be coupled to one or more track connection modules 82, which may provide the power to the connected track sections 36. As shown in FIG. 4, each track connection module 82 is coupled to two adjacently positioned track sections 36. In this way, power may be routed from the track connection module 82 to a first track section 36, which may use the power, and the first track section 36 may then route the power to another track connection module 82. As such, each track connection module 82 may include circuitry that receives power and outputs powers to track sections 36.

To increase the flexibility in the design of linear motor systems 10, it may be useful to employ different types of track connection modules 82. Moreover, it may be inefficient to have track connection modules 82 to include circuitry to receive communication from the remote control and/or monitoring circuitry 30 or other external circuits, as well as receive power from the power and control circuitry 28 or other power source. Indeed, after a communication link is established at one track section 36 of the linear motor system 10, it may be useful to leverage the interconnectedness of the track sections 36 to communicatively couple each track section 36 to each other via internal circuitry of the track sections 36 and the track connection modules 82. In the same manner, power may also be distributed across the linear motor system 10 by way of the interconnectedness of track connection modules 82 and track sections 36 in the linear motor system 10.

Keeping this in mind, FIG. 5 illustrates a perspective view 90 a collection of track sections 36 physically and communicatively coupled to each other via a collection of track connection modules 82. As shown in FIG. 5, in one embodiment, the track connection modules 82 may connect two track sections 36 to each other. It should be noted that the connection modules 82 may include input and output ports that facilitate connection between various types of track sections 36. Indeed, a curved track section 16 may be coupled to a straight track section 14 via physical connections that connect the tracks 12 of each of the curved track section 16 and the straight track section 14, as well as via physical connections that connect track connection modules 82 between different types of track sections 36.

Referring again to FIG. 5, it is apparent that one of the track connection modules 82 includes provisions to receive or transmit data and/or power outside of the linear motor system 10 created by the connected curved track sections 16 and the straight track sections 14. By way of example, a track entry connection module 92 may be a type of track connection module 82 that is capable of receiving power from an external power source and data from a remote control system or network.

Since the linear motor system 10 of FIG. 5 is a closed loop of interconnected track connection modules 82, it would be inefficient to use the track entry connection module 92 between each adjacent track section 36. That is, the power provided to the track entry connection module 92 may be distributed to other track connection modules 82 and other track sections 36 from the track entry connection module 92. In this way, instead of providing the capability to communicate data and receive power at each track section 36, the connected track sections 36 and the connected track connection modules 92 may provide the circuitry involved with distributing the communication channels and power rails between the track sections 36. As such, in addition to the track entry connection module (TECM) 92, the track sections 36 may be electrically connected (e.g., for power distribution and communication channel) to each other via pass through connection modules (PTCM) 94. The PTCMs 94 may enable power and data to be distributed between track sections 32, TECMs 92, and other PTCMs 94 without including the input/output circuitry that enables the connection module 82 to receive power from external power sources or communicate data with external devices.

Figure 6:
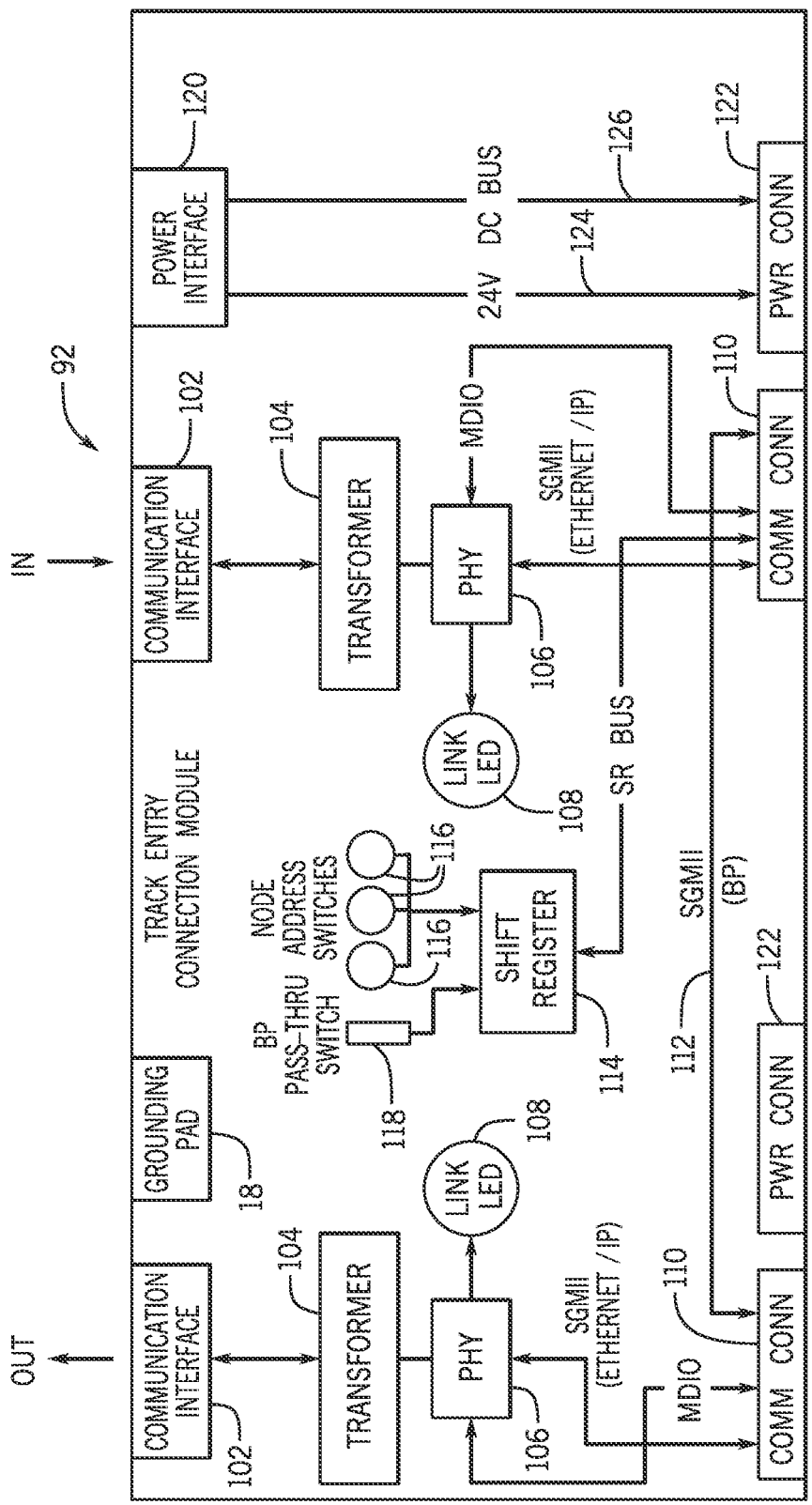
FIG. 6 is a block diagram of a track entry connection module, in accordance with embodiments described herein.

With this in mind, FIG. 6 illustrates a block diagram of one embodiment for the TECM 92. As shown in FIG. 6, the TECM 92 may include a number of circuit components that enable the TECM 92 to communicate data with external devices and receive power via external power sources. Before continuing, it should be noted that the block diagram of the TECM 92 of FIG. 6 includes certain components to enable the TECM 92 to perform various operations and functions. However, it should be understood that the TECM 92, in other embodiments, may include other components that enable the TECM 92 to perform the same functions. As such, the TECM 92 should not be limited to employ the components described below.

Referring now to FIG. 6, the TECM 92 may include one or more communication interfaces 102 that may enable the TECM 92 to establish a communication between itself and the track section 32. The communication interface 102 may be any suitable communication port that facilitates communication between devices. As such, the communication interface 92 may enable the TECM 92 to communicate data via Ethernet/IP, ControlNet, DeviceNet, and other communication protocols. In one embodiment, the communication interface 102 may include an M12 X-code connector component that may facilitate Ethernet/IP communication. In some embodiments, the first communication interface 102 (e.g., input port) may receive data from an external network or device and the second communication interface 102 may be connected to the last track section 32 of the linear motor system 10. As a result, the linear motor system 10 may be connected to a network with either a line or a ring topology. The ring topology may allow for redundancy since if the ring is broken at a single point, communications may still be maintained to every track section 32.

In some embodiments, the communication interface 92 may be coupled to a transformer 104 that may transform voltage or data signals received via the communication interface 102 into a data format that may interpretable by the drive circuitry 54 or other suitable component on the track section 36. The data received via the communication interface 102 and output by the transformer 104 may be provided to a physical channel 106 (e.g., physical interface integrated circuit), which may be coupled to a link light-emitting diode (LED) 108. The physical channel 106 may include circuit traces or other suitable communication channel that distributes the data from the transformer 104 to other portions of the TECM 92. The link LED 108 may be any suitable light source that illuminates in response to detecting a communication link with an external device. The physical channel 106 may be coupled to a communication connection component 110, which may facilitate communication between different track connection modules 82 via Serial Gigabit Media Independent Interface (SGMII) connection bus or other suitable connection bus in the physical layer.

The TECM 92 may include multiple communication connection components 110 that may be communicatively coupled to each other via a backplane link 112. The backplane link 112 may enable data to communicate between the communication connection components 110 using SGMII connection bus. It should be noted that the communication pathway between the communication interface 102 and the communication connection component 110 may be referred to as the front plane, which is accessible to external devices and the track section 32. However, the backplane link 112 may be a propriety communication channel that is not accessible to components other than the TECM 92. With this in mind, the backplane link 112 may be coupled to other circuit components, such as a shift register 114, node address switches 116, a backplane pass-through switch 118, and the like to establish an network identification address for the TECM 92. That is, the shift register 114 and the node address switches 116 provide a way to uniquely address the section to which the TECM 92 is connected to. In this way, the TECM 92 may allow the user to set the IP address of the first track section 32. It should be noted that the backplane link 112 may be independent of the other circuit components described above. By keeping the backplane link 112 isolated from other communication interfaces 102 and external devices connected therethrough, the TECM 92 may maintain a level of security in the communication distributed via the connection modules 82 by preventing outside access to the backplane link 112.

In addition to providing communication data between the track sections 32 and the track connection modules 82, the TECM 92 may receive power from an external power source via a power interface 120. The power interface 120 may be any suitable power input port that receives voltage via an external power source. In one embodiment, the power interface 120 may be an M24 component that is coupled to 24 volt external power source. The power interface 120 may be coupled to a power connection component 122 via an analog bus 124 and a direct-current (DC) bus 126.

The power provided via the power interface 120 may be electrically coupled to the track section 32 via the power connection component 122. As mentioned above, the TECM 92 may couple two adjacent track sections 32 together. As such, one power connection component 122 and one communication connection component 110 of the TECM 92 may be coupled to one track section 32, which another power connection component 122 and another communication connection component 110 of the TECM 92 may be coupled to another track section 32. The connections between adjacent track sections 32 and track connection modules 82 will be detailed below with reference to FIGS. 11 and 12.

In addition to the components of the TECM 92 described above, the TECM 92 may also include a grounding pad 128 that may provide a location on the TECM 92 that circuit components may be connected to provide a single grounding point. The grounding pad 128 may be part of each track connection module 82 to provide a consistent grounding location for each track section 32 of the linear motor system 10. That is, each of the grounding pads 128 may be electrically coupled to a chassis or ground rail to provide a common ground for the linear motor system 10.

Figure 7:
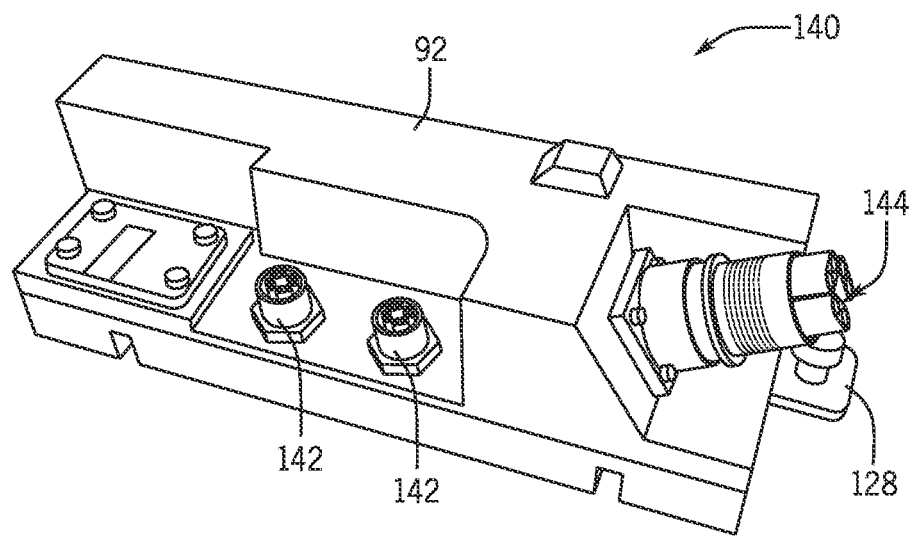
FIG. 7 is a first side view of the track entry connection module of FIG. 6, in accordance with embodiments described herein.
Figure 8:
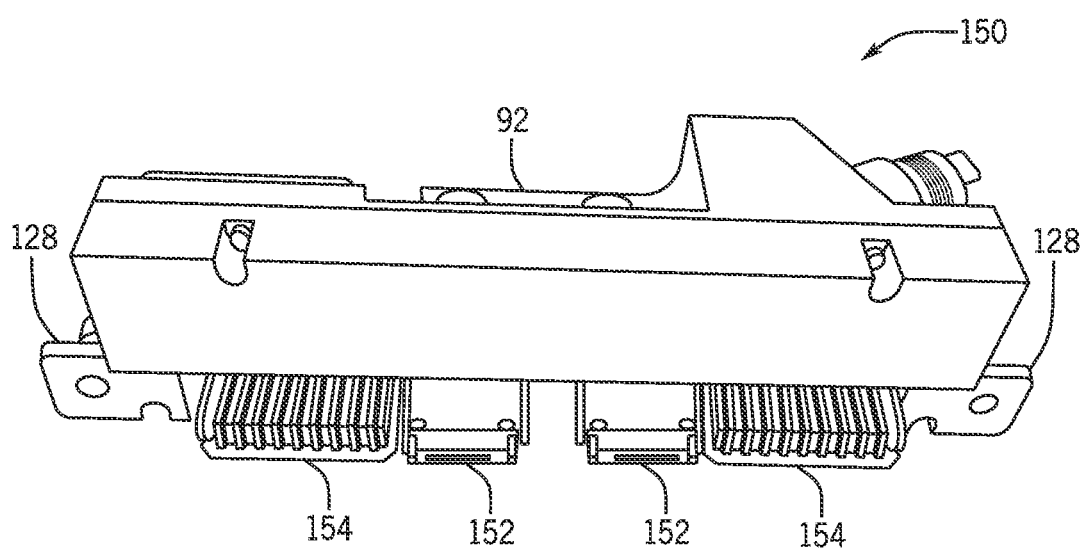
FIG. 8 is a second side view of the track entry connection module of FIG. 6, in accordance with embodiments described herein.

By way of example, FIG. 7 illustrates a first view 140 of the TECM 92. As presented in FIG. 7, the TECM 92 includes communication connectors 142 that communicatively couple to the communication interfaces 102. In addition, the TECM 92 includes a power connector 144 the electrically couples to the power interface 120. As shown in the first view 140, the connections for the communication interfaces 102 and the power interface 120 are disposed on one side of the TECM 92. FIG. 8, in turn, depicts a second view 150 of the TECM 92 that corresponds to the opposite side presented by the first view 140 of FIG. 7. In the second view 142, communication connectors 152 (e.g., ports or interconnects) for the communication components 110 are disposed adjacent to each other about the center of the TECM 92. The power connectors 154 for the power components 122 are positioned adjacent to the to the communication connectors 152 and adjacent to the edge of the TECM 92. In certain embodiments, the communication connectors 152 may be any suitable serial connector that connects to a corresponding female connector disposed on the track section 32. In the same way, the power connectors 154 may be any suitable power connector that physically couples to a female counterpart disposed on the track section 32. It should be noted that although the communication connector 152 and power connectors 152 of the TECM 92, or other track connection modules 82, are illustrated and described as being male components, in other embodiments, the connectors may be female pieces with male counterparts disposed on the track sections 32. In addition, although the communication connectors 152 and the power connectors 122 are described as being disposed in a particular location, it should be noted that the communication connectors 152 and the power connectors 122 may be positioned in any suitable location, with complementary pieces disposed on the track sections 32.

Each communication connector 152 and power connector 154 pair of the TECM 92 may mechanically couple to female corresponding connectors disposed on one end of the track section 32. As such, the communication connector 152 and the power connector 152 may provide a mechanism to fasten the TECM 92 to the track section 32, while also connecting the communication channel and power rail between the two. As such, the track sections 32 may be coupled together without using additional or excess wiring that may be difficult to route and/or position. In addition, the TECM 92 (or other suitably manufactured track connection modules 82) may seal the connection between adjacent track sections 32 to meet certain ingress protection ratings or the like.

In addition, by using the communication connectors 152 and the power connectors 154 of the TECM 92 to connect different track sections 32, the track sections 32 may be installed more easily, as compared to employing wires between different track sections 32. That is, the mechanical coupling between male and female components of the communication connectors 152 and power connectors 154 of the TECM 92 and the track sections 32, respectively, may reduce the amount of time involved with connecting a number of track sections 32 together. Moreover, by eliminating the use of wires between track sections 32, the TECM 92 provides for a reduced transverse width that reduces the amount of physical space used by the linear motor system 10.

Figure 9:
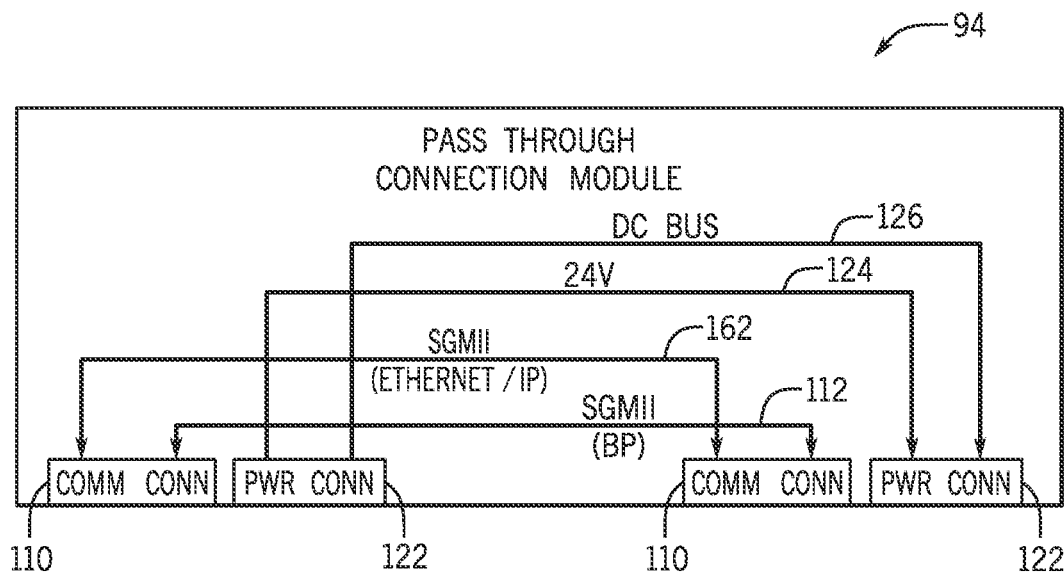
FIG. 9 is a block diagram of a pass through connection module, in accordance with embodiments described herein.

As mentioned above, it may be inefficient to use the TECM 92 at each track section 32, since the power and communication channels may be distributed between track sections 32 using track connection modules 82. With this in mind, FIG. 9 illustrates a pass through connection module (PTCM) 94 that includes the communication connection components 110 and the power connection components 122 described above with respect to the TECM 92.

Since the PTCM 94 does not receive power from an external power source or establish communication with a network or a device external to the linear motor system 10, the PTCM 94 may instead be used to connect different track sections 32. That is, the PTCM 94 may electrically and communicatively couple two track sections 32, such that the power available on one track section 32 maybe transferred to the other track section 32 via analog bus 124 and DC bus 126. In the same fashion, the PTCM 94 may communicatively couple one track section 32 to another track section 32 via the backplane link 112. In addition to the backplane link 112, the PTCM 94 may include a SGMII link 162 between the two communication connection components 110 that may communicate Ethernet/IP data between track sections 32.

Figure 10:
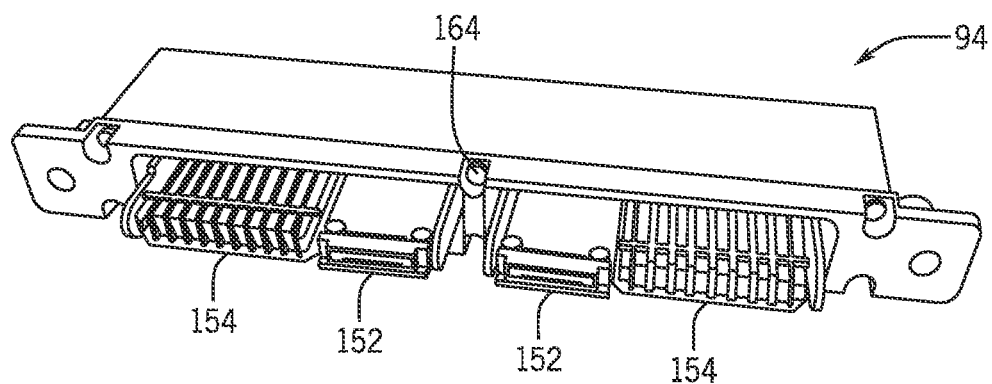
FIG. 10 is a side view of the pass through connection module of FIG. 6, in accordance with embodiments described herein.
Figure 11:
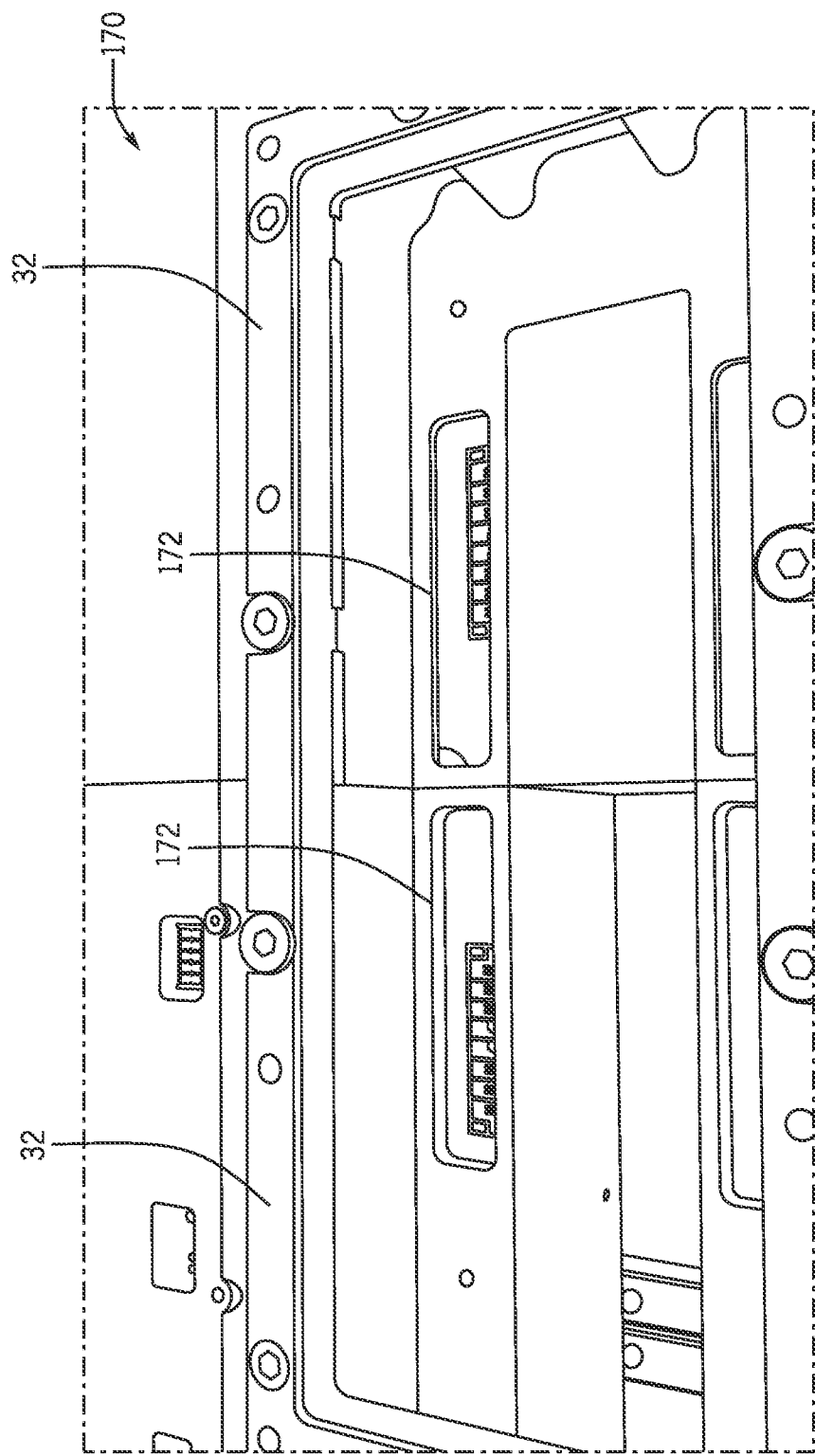
FIG. 11 is a first view of two track sections positioned adjacent to each other without track connection modules connected to the track sections, in accordance with embodiments described herein.

Referring to FIG. 10, the PTCM 94 may also include the communication connectors 152 and the power connectors 154 positioned in the same manner as described above for the TECM 92. That is, the pair of power connectors 154 may be positioned outside of the pair of communication connectors 152 about a center axis 164 of the PTCM 94. For example, FIG. 11 illustrates a first view 170 of two track sections 32 that include apertures 172 in which the female counterpart connectors for the communication connectors 152 and the power connectors 154 are disposed.

Figure 12:
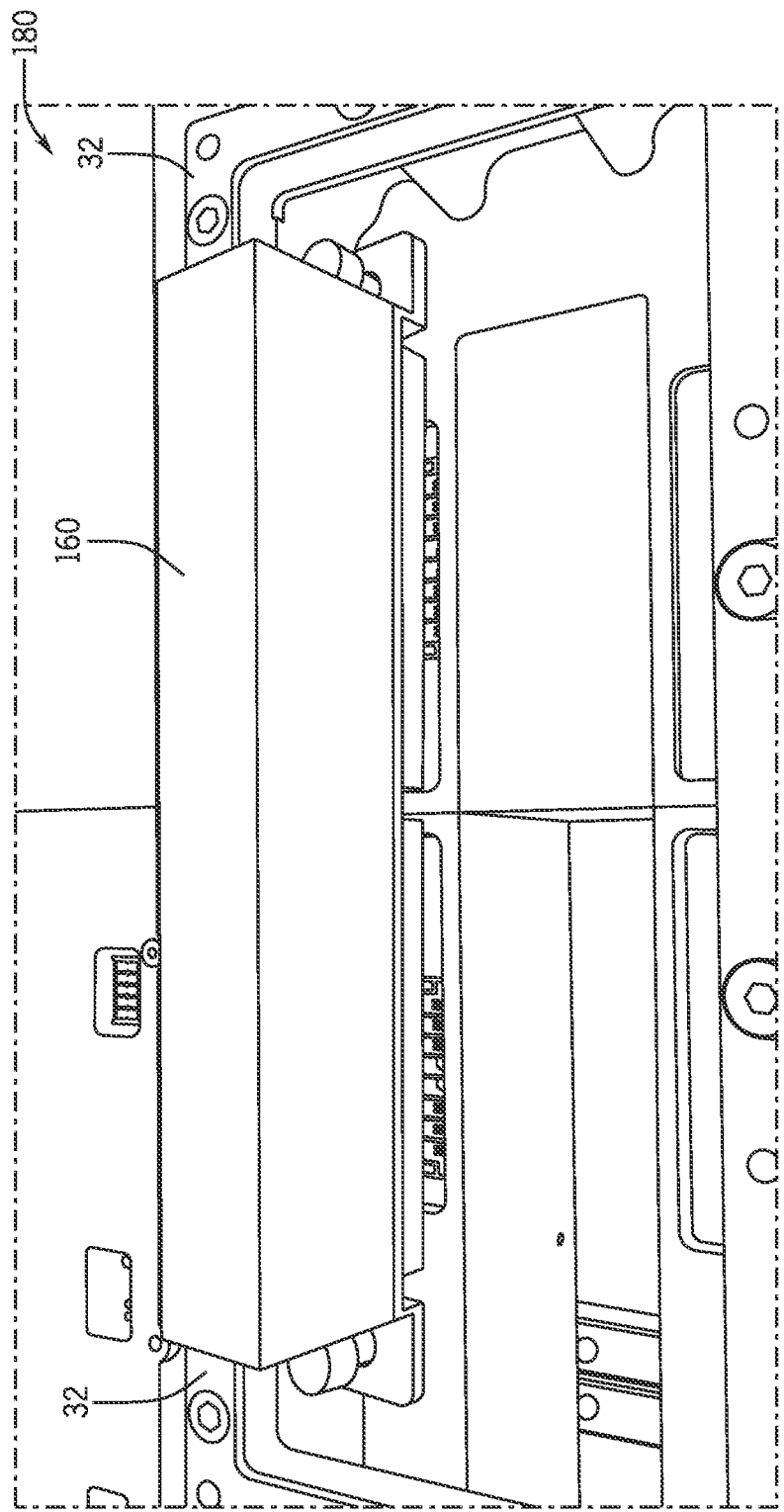
FIG. 12 is a second view of the two track sections of FIG. 11 with a track connection module connected to the adjacent track sections, in accordance with embodiments described herein.

With this in mind, FIG. 12 illustrates a second view 180 that depicts the PTCM 94 coupled to the two track sections 32. That is, the male parts of the communication connectors 152 and the power connectors 154 in the PTCM 94 may be fitted into the female counterparts of the communication connectors 152 and the power connectors 154 in the track sections 32, thereby communicatively and electrically coupling the two adjacent track sections 32 together.

As such, the connection connectors 152 and the power connectors 154 of the PTCM 94 may be used to couple two track sections 32 in the same manner as the TECM 92 described above. Thus, the TECM 92 and the PTCM 94 may be used interchangeably in the linear motor system 10 to provide increased flexibility for linear motor track design. That is, since the TECM 92 and the PTCM 94 may be coupled to any track section 32, the location or power/communication interconnects may be positioned within a proximity to any portion of the linear motor system 10. For example, it the north portion of a facility includes the network and power cables for external sources, and if the linear motor system designer wishes to include a curved track section 16 at the north portion of the facility, the linear motor system designer may simply use the TECM 92 at the curved track section 16 and use PTCMs 94 throughout the remaining track sections 32 of the linear motor system 10. As a result, the designer is not limited by the position of various electrical or communication connections when creating a design for the linear motor system 10.

In some embodiments, the different parts of the linear motor system 10 may not receive sufficient power or voltage via the collection of PTCMs 94. That is, as each PTCM 94 distributes power across each track section 32 of the linear motor system 10, the voltage may decrease due to impedance in the track sections 32, the PTCMs 94, the rail or conduit used to transmit the power, and the like. In addition, the power demands of the linear motor system 10 may use an additional power feed at various locations. As such, in some embodiments, additional power may be provided to the linear motor system 10 or to a separate section of the linear motor system 10 via a track entry connection module for power (TECM-P).

Figure 13:
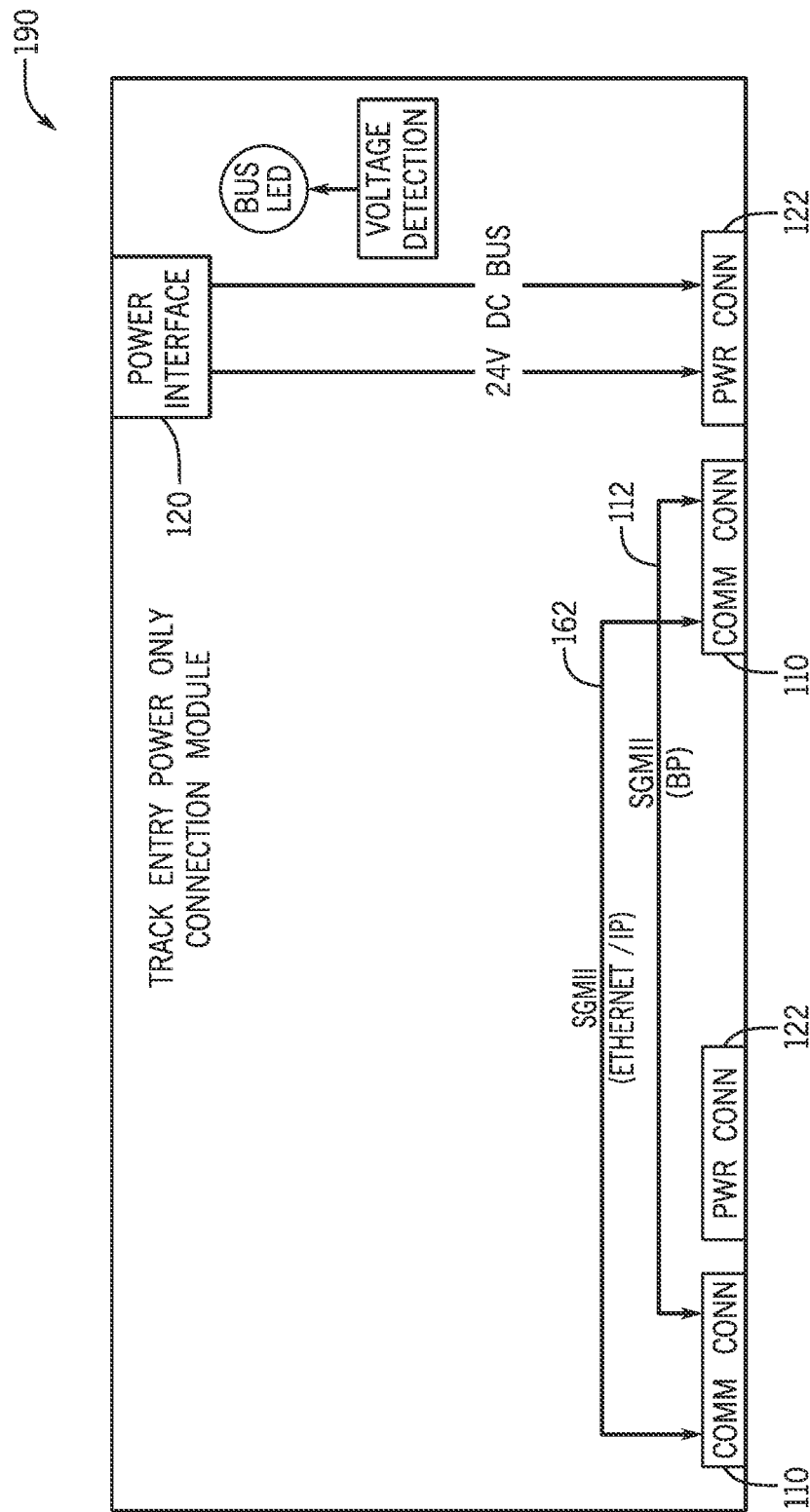
FIG. 13 is a block diagram of a track entry connection module for power, in accordance with embodiments described herein.

FIG. 13 illustrates a block diagram of the TECM-P 190 that may receive power (e.g., voltage) from an external power source. As such, the TECM-P 190 may include the power interface 120, the power connectors 122, and the communication connectors 110 described above. In this way, the TECM-P 190 may provide an additional connection to an external power source to provide power to a separate portion of the linear motor system 10. In one embodiment, the placement of the TECM-P 190 in the linear motor system 10 may break the power train provided via the TECM 92. Therefore, the TECM-P 190 may provide additional power to the linear motor system 10 based on need or design. In some embodiments, the TECM-P 190 or other suitable connection modules may include an LED indicating that voltage higher than some threshold may present in the respective module.

Like the TECM 92 and the PTCM 94 described above, the power connectors 122 and the communication connector components 110 of the TECM-P 190 may be positioned in a similar manner as the TECM 92 and the PTCM 94. Therefore, the TECM-P 190 may increase the flexibility in the design of the linear motor system 10.

With the foregoing in mind, FIGS. 14-17 illustrates various embodiments in which the TECM 92, the PTCM 94, and the TECM-P 190 may be incorporated into the linear motor system 10. Before continuing, it should be noted that the embodiments depicted in FIGS. 14-17 are example arrangements in which the TECM 92, the PTCM 94, and the TECM-P 190 may be implemented into the linear motor system 10. Indeed, various permutations and arrangements of the TECM 92, the PTCM 94, and the TECM-P 190 with the track sections 32 to facilitate the design of a desired linear motor system 10.

Figure 14A:
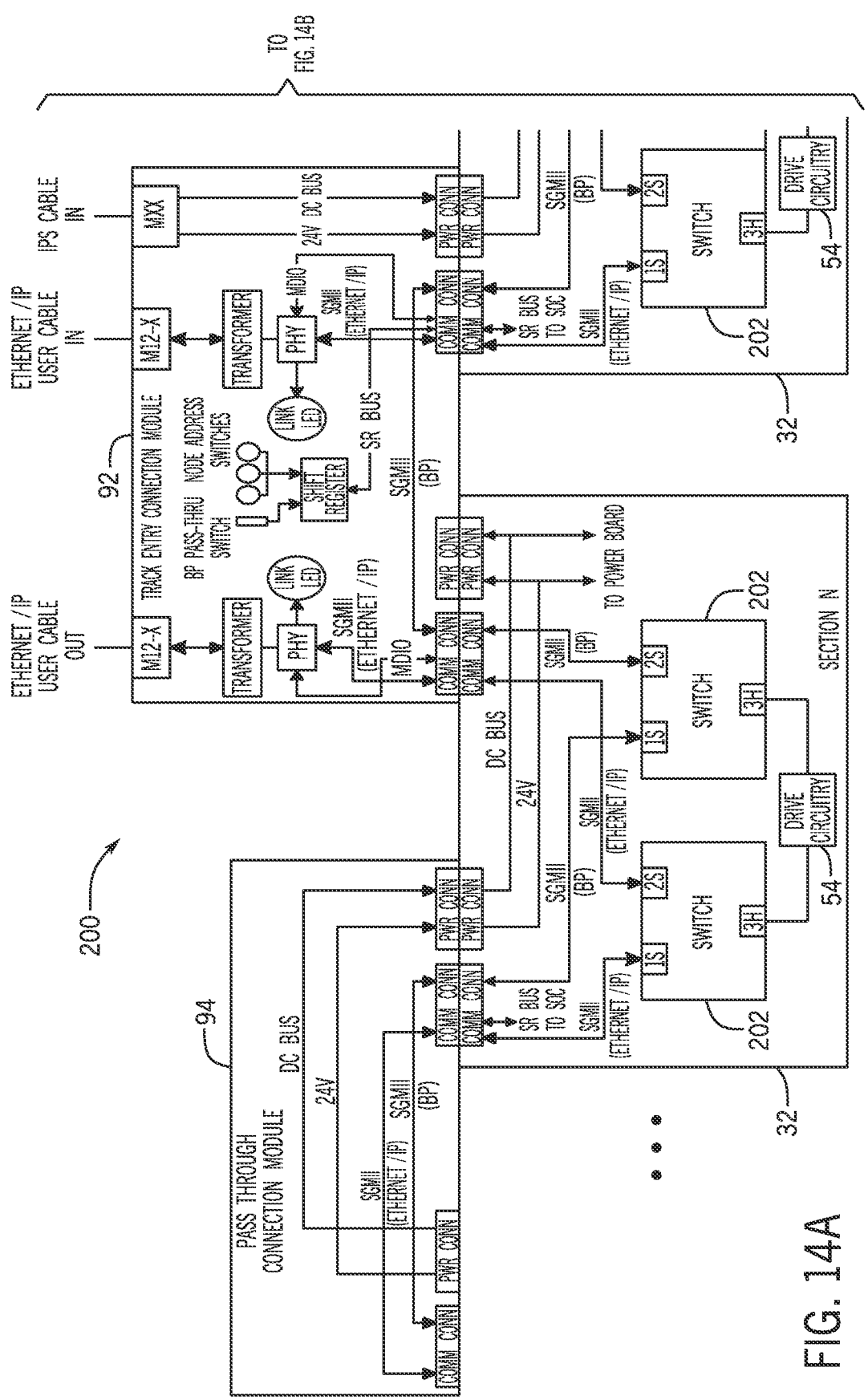
FIGS. 14A and 14B are a block diagram of a first example linear motor system that employs various types of track connection modules, in accordance with embodiments described herein.
Figure 14B:
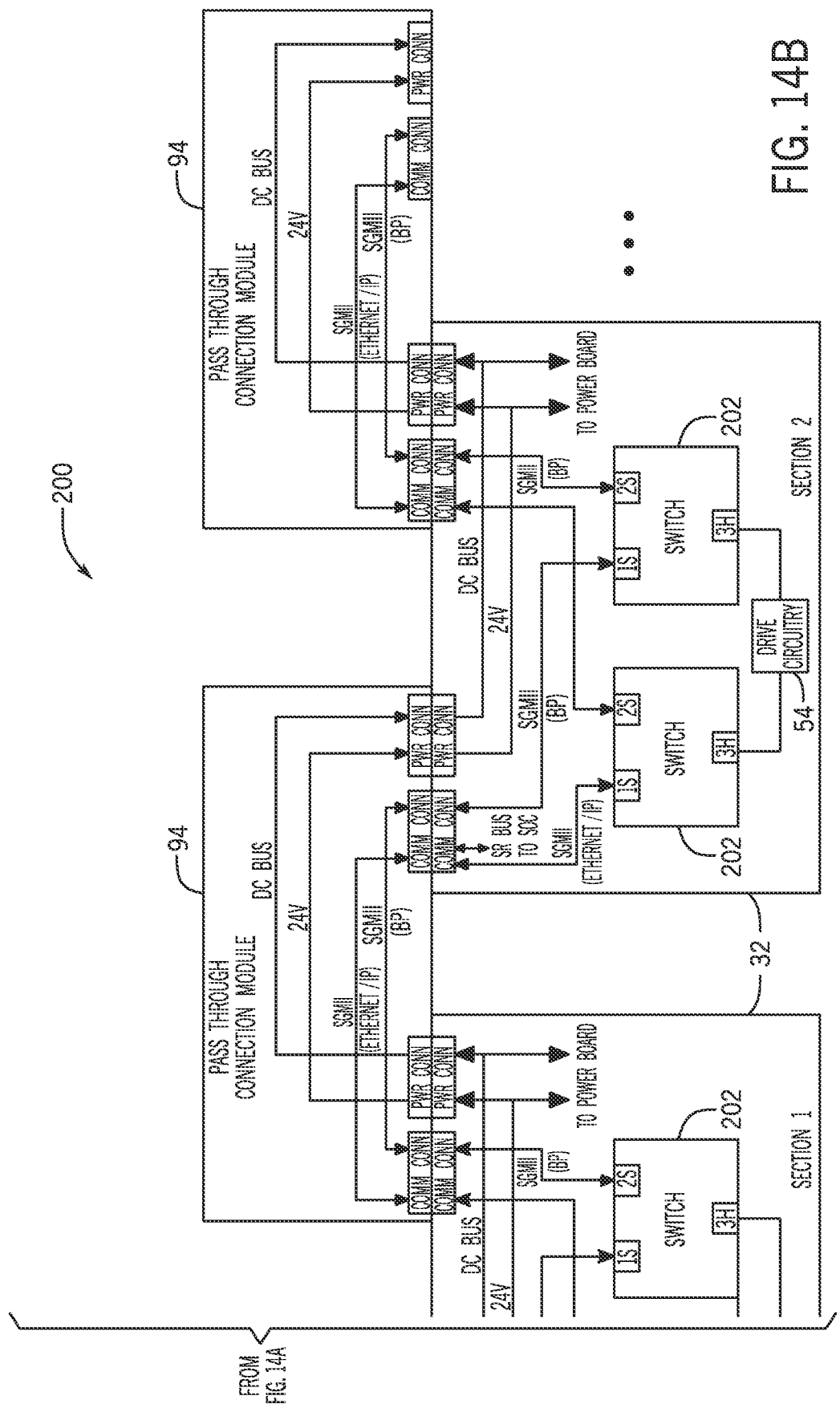

Referring first to FIG. 14, a linear motor system 200 is illustrated having one TECM 92 and a number of PTCMs 94. As such, the TECM 92 may provide power to each track section 32 via the power interface 120 and the power connection components 122. In addition, the TECM 92 may establish a communication link to any suitable network or communication channel via the communication interface 102. Moreover, the TECM 92 may distribute the data between track sections 32 via the communication connection components 110. In the linear motor system 200, the TECM 92 may establish one IP network for each component that is part of the linear motor system 200. As such, each track section 32 may be associated with its own IP address that commands may be directed towards. In some embodiments, data received by the track sections 32 via the communication connection components 110 may be received by a switch component 202, such as an Ethernet/IP switch or other communication switch. The switch component 202 may provide data communicated via the track sections, the TECM 92, and the PTCM 160 to the drive circuitry 54 or other suitable processor that may control the operation of the track section 32.

Figure 15A:
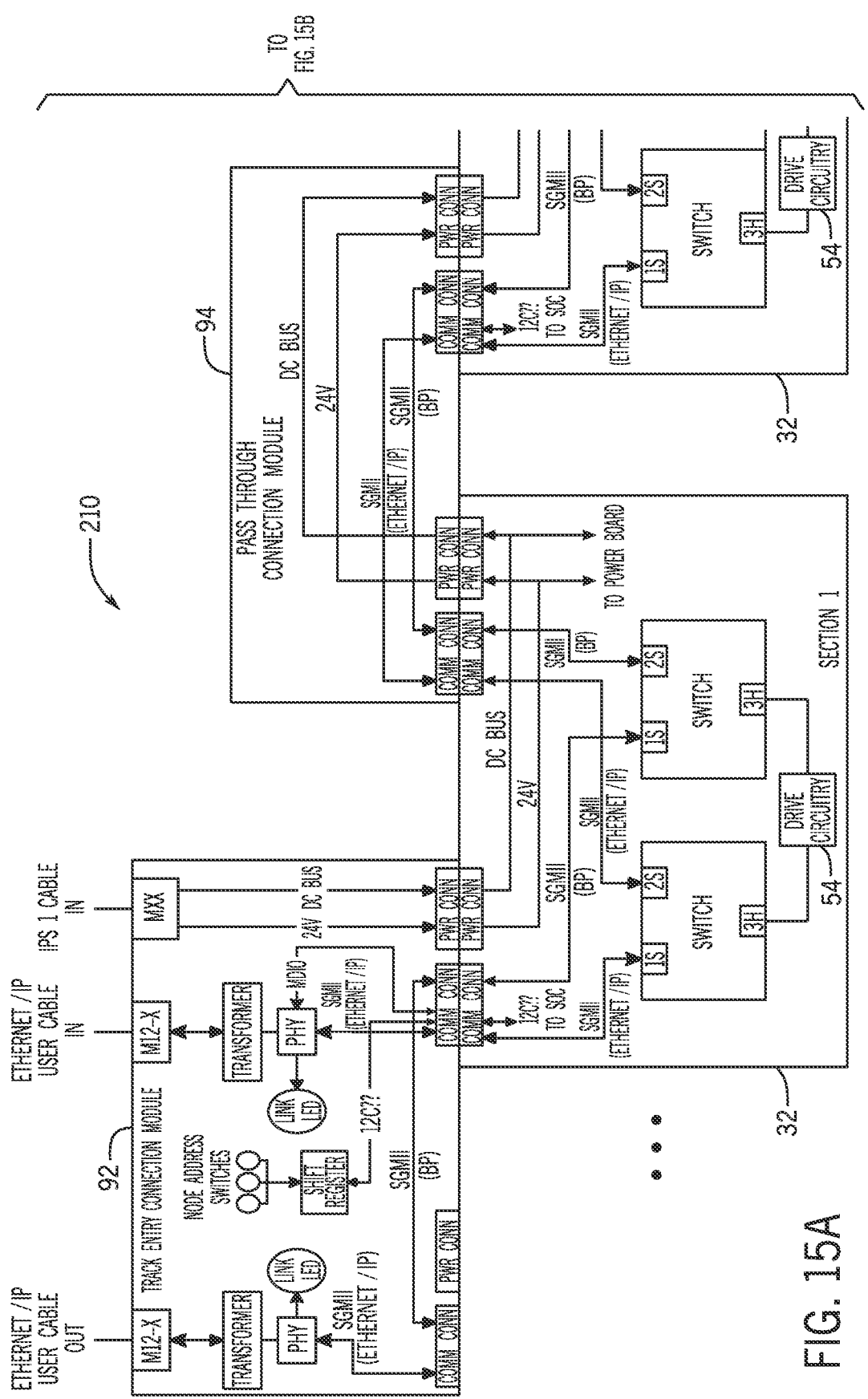
FIGS. 15A and 15B are a block diagram of a second example linear motor system that employs various types of track connection modules, in accordance with embodiments described herein.
Figure 15B:
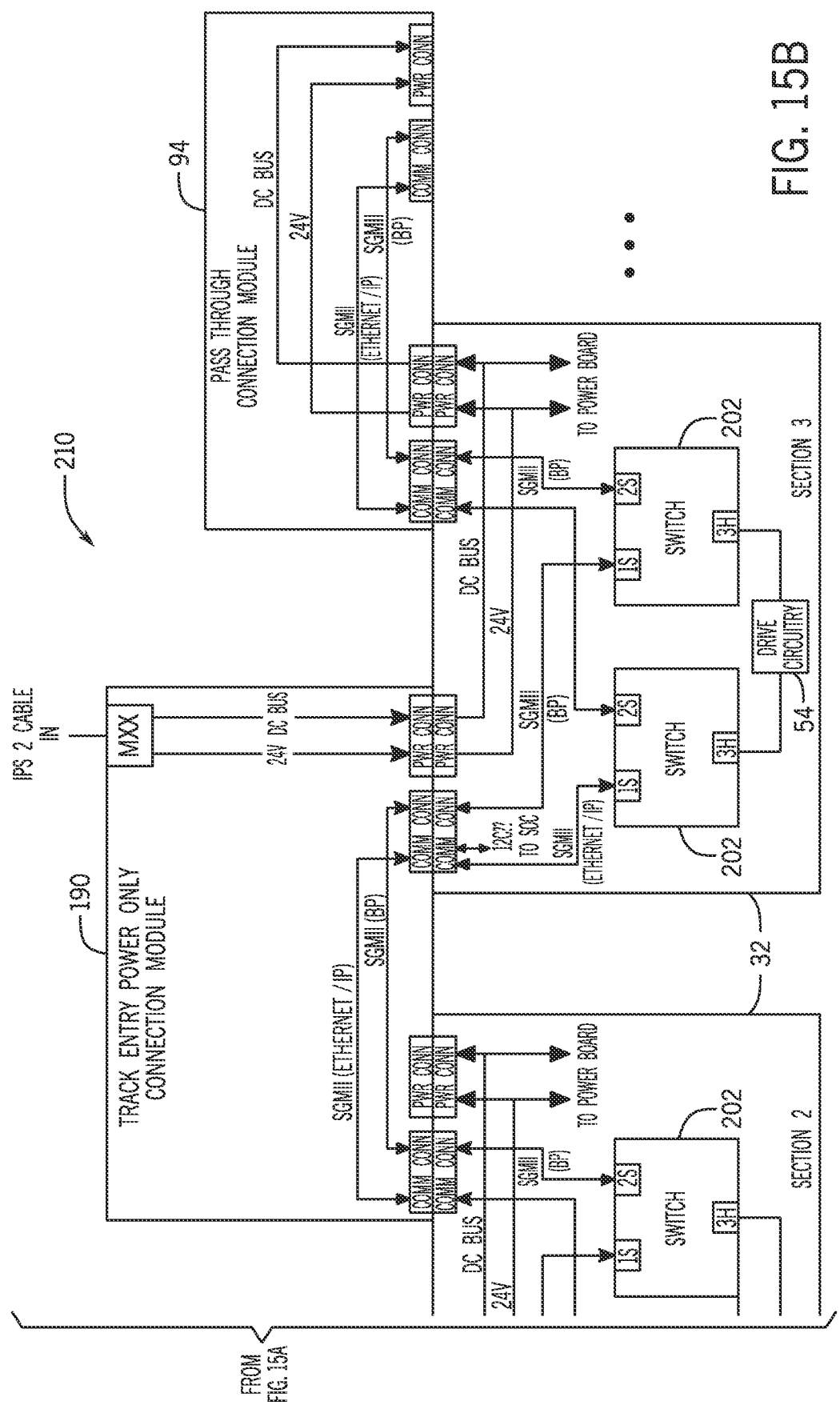

FIG. 15 illustrates a linear motor system 210 that employs the TECM 92, the PTCM 160, and the TECM-P 190, as described above. That is, the linear motor system 210 may receive power from the TECM 92 and the TECM-P 190 at two different track sections 32. As shown in FIG. 15, the TECM 92 may provide power to the track sections 32 labeled sections 1 and 2 of FIG. 15. The TECM-P 190, in turn, may provide power to the track sections 32 labeled section 3 and the additional track sections 32 that are downstream from section 3. As a result, the TECM 92 may provide power to one portion of the linear motor system 210, while the TECM-P 190 to a second portion of the linear motor system 210. Although the power is distributed through two portions of the linear motor system 210, the communication network in the linear motor system 210 is maintained throughout via the TECM 92, the PTCM 160, and the TECM-P 190.

Figure 16A:
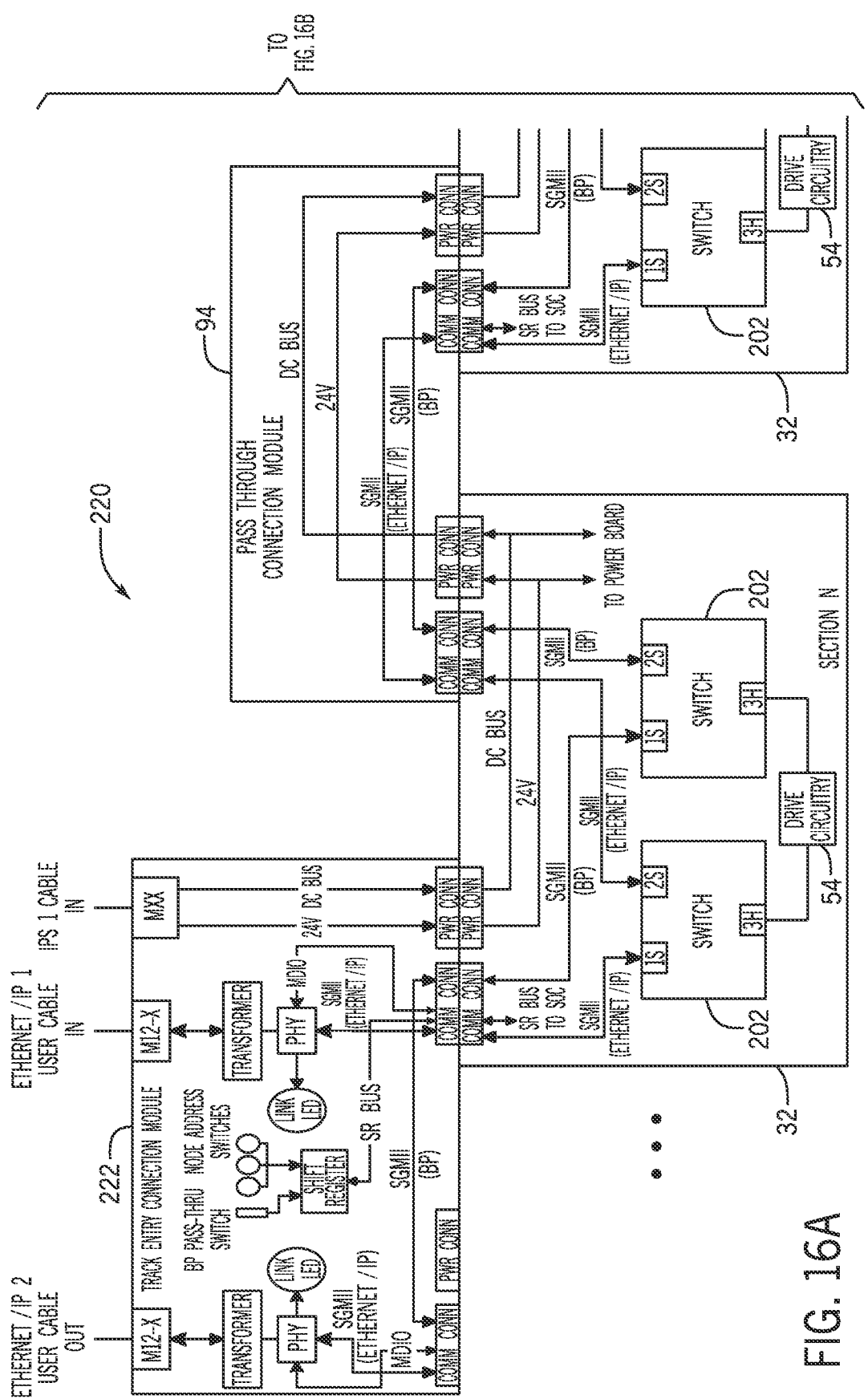
FIGS. 16A and 16B are a block diagram of a third example linear motor system that employs various types of track connection modules, in accordance with embodiments described herein.
Figure 16B:
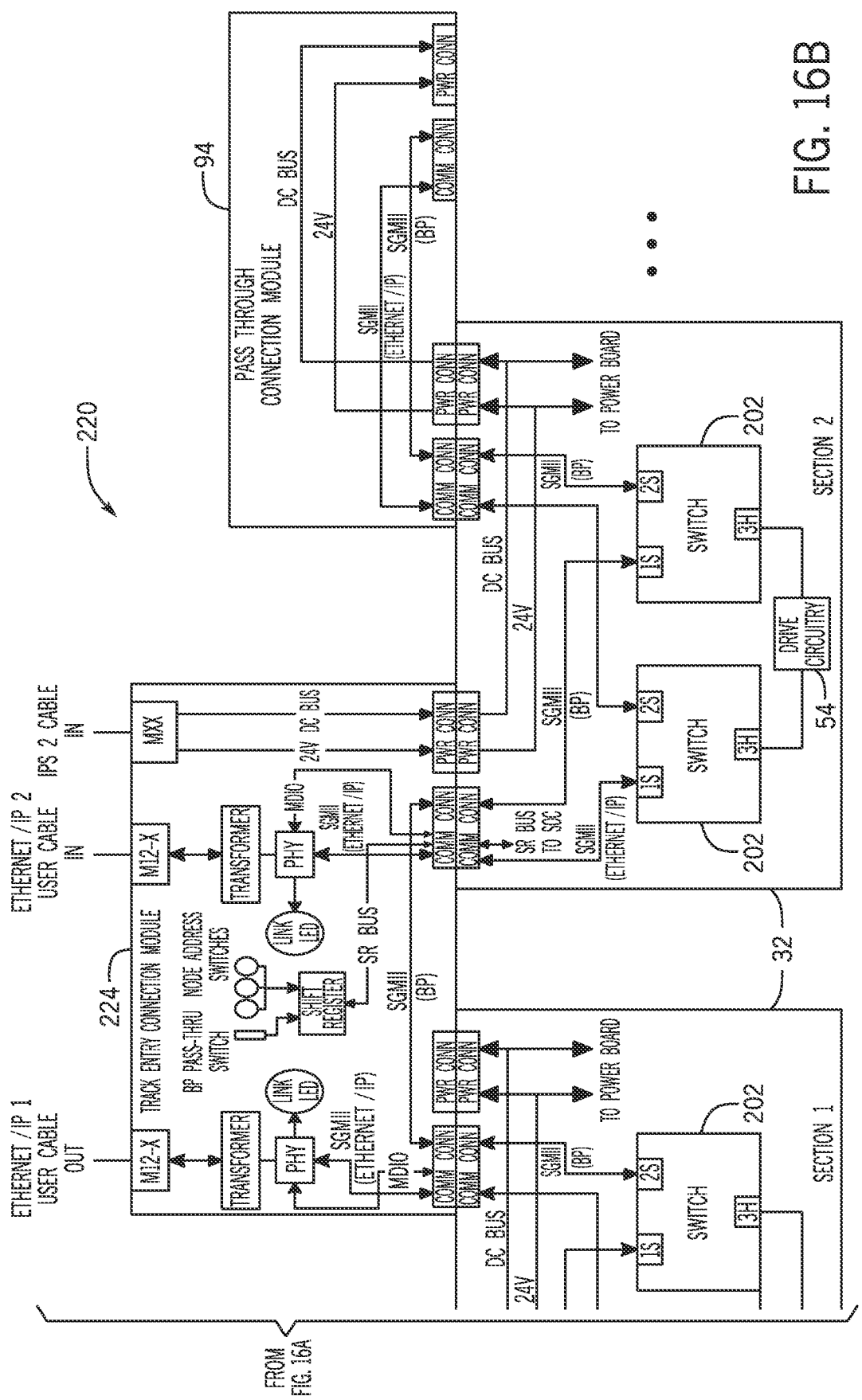

FIG. 16 illustrates a linear motor system 220 that employs two TECMs 92 to create different subnets for the communication network of the linear motor system 220. That is, a first TECM 222 that establishes a starting IP address for track sections 32 labeled section n and section 1 using a first subnet of addresses. A second TECM 224 may provide an additional set of IP addresses using a second subnet of addresses for track section 32 labeled section 2 and those track sections 32 downstream from section 2. In one embodiment, the backplane pass-through switch 118 of the TECM 224 may be positioned to enable the TECM 224 to pass through data communicated via one of the communication interfaces 102 to the downstream track sections 32. The setting on the backplane pass-through switch 118 may be detected by the switch 202 of the section 2 track section 32 to operate as a normal switch 202 that provides data to the drive circuitry 54 and the adjacent or downstream PTCMs 94.

The linear motor system 220 that includes two subnets may be useful when the TECMs 222 and 224 are coupled to an Ethernet/IP module or switch that has a limited number of Ethernet/IP connectors. As such, by adding multiple TECMs 92 to the linear motor system 10, the linear motor system 10 may increase in size with the number of track sections 32 while maintaining a single communication network (e.g., via multiple subnets) through the linear motor system.

Figure 17A:
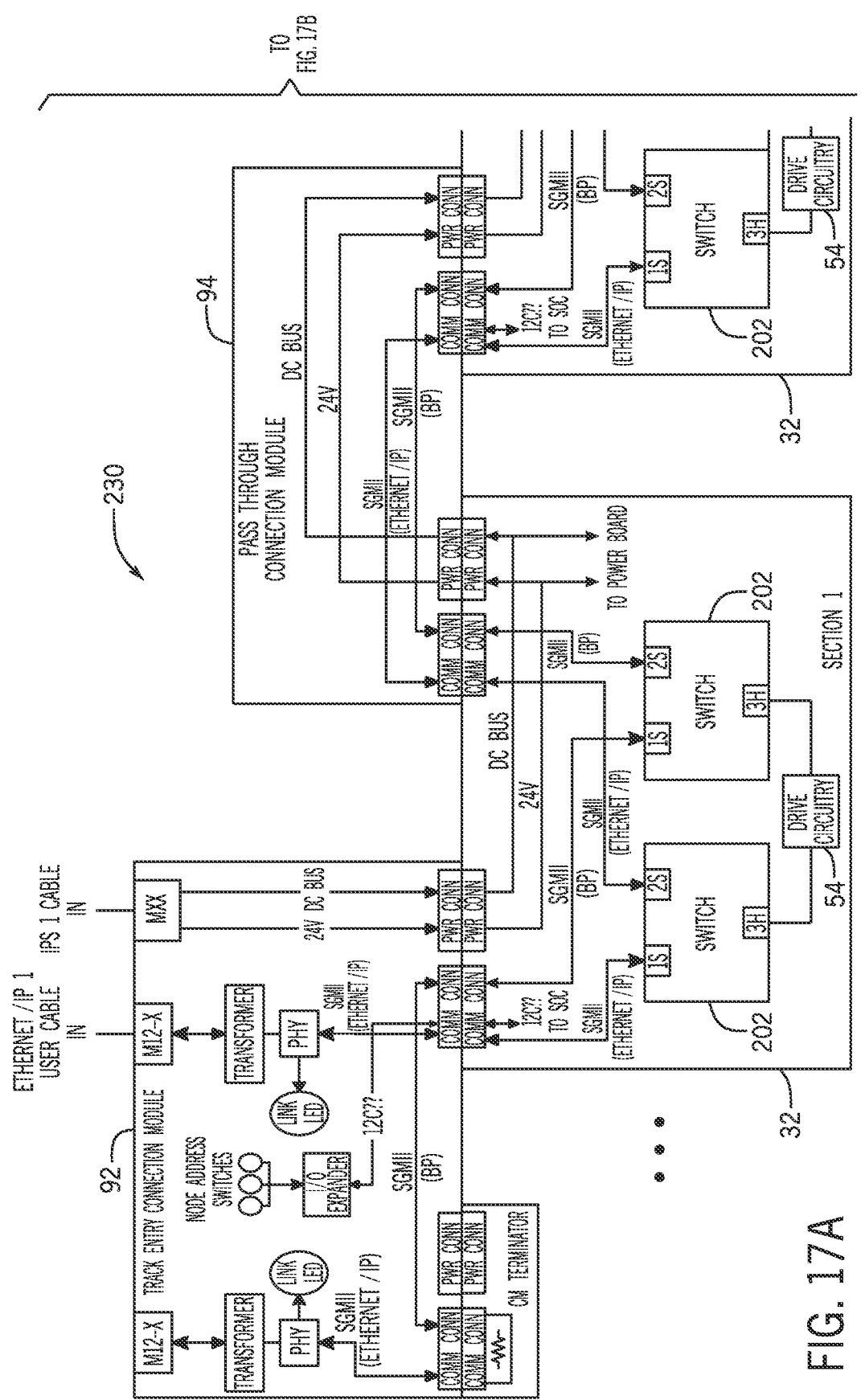
FIGS. 17A and 17B are a block diagram of a fourth example linear motor system that employs various types of track connection modules, in accordance with embodiments described herein.
Figure 17B:
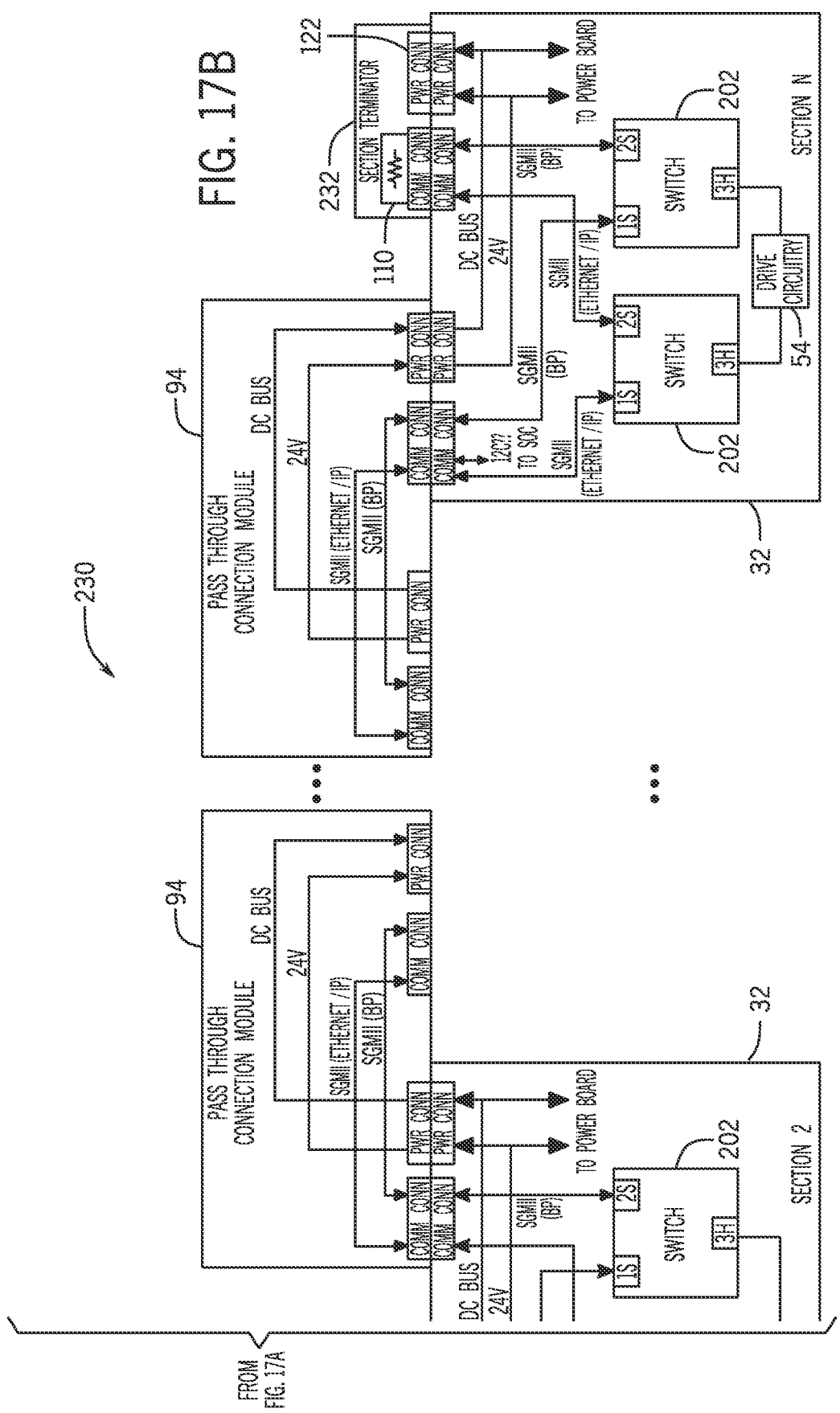

In some embodiments, the linear motor system 10 may operate with an end position. For example, FIG. 17 illustrates a linear motor system 230 that includes the TECM 92, PTCMs 94, and a section terminator module 232. The section terminator module 232 may be positioned at an end of the linear motor system 230 where the track sections 32 end. In one embodiment, the section terminator module 232 may have a single communication connector component 110 and a single power connector component 122. The single communication connector component 110 of the section terminator module 232 may be terminated using a resistor or some other circuit component. In the same manner, the single power connector component 122 of the section terminator module 232 may be floating or not coupled to other circuit components.

By employing the various types of connection modules 82 described herein, linear motor systems 10 may have improved flexibility by implementing multiple subnets within the single linear motor system 10. In addition, since the connector modules 82 are separate from the track sections 32, various designs and configurations for the linear motor system 10 may be implemented. For example, the power and communication connections to external devices may be positioned at various positions in a facility or environment that the linear motor system 10 is placed.

Additionally, as the size or number of track sections 32 increase in a linear motor system 10, additional power may be injected where the power may be dissipated across the number of track sections 32. As a result, the distance in which the linear motor system 10 may traverse may be increased, thereby spanning a longer distance.

Moreover, by using the connection modules 82 with connectors that interface with track sections 32 in such a fashion that they mechanically couple to each other, the connected track sections 32 and connection modules 82 may couple together while also communicatively and electrically coupling together. As such, the risk of connecting incompatible components to the track sections 32 is limited. In addition, the ease of connecting various track sections 32 may enable assemblers to assemble the linear motor system 10 in a more efficient manner.

It should also be noted that by using the TECM 92 described herein, the IP address for the track sections 32 may be set once, while maintaining the ability to add multiple subnets using another TECM 92. Further, the communication connector components 110 and the backplane link 112 may provide the track section to interface with the connection modules 82 via a MAC-to-MAC interface without involving a physical (PHY) layer between the two.

In addition, by providing the Ethernet/IP and physical layer components in the connection modules 82, as opposed to the track sections 32, the circuitry that employs the magnetic fields to cause the movers 18 to move may be better isolated from communication components and circuitry, thereby reducing noise being present in the communication channels.

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A track module, comprising:
 a plurality of communication connectors, each communication connector configured to communicatively couple to a corresponding track section and configured to transfer data between the track module and the corresponding track section, wherein the corresponding track section is configured to enable a mover to traverse the corresponding track section via one or more electromagnetic forces;
 a plurality of power connectors, each power connector configured to electrically couple to the corresponding track section and configured to transfer power between the track module and the corresponding track section; and
 circuitry configured to establish an Internet Protocol (IP) address associated with the corresponding track section.

2. The track module of claim 1, wherein the circuitry is configured to establish a network identification address associated with the track connection module.

3. The track module of claim 1, wherein the circuitry comprises a shift register, a node address switch, a backplane pass-through switch, or any combination thereof.

4. The track module of claim 1, comprising:
 a communication interface configured to transfer data between the track module and an external device; and
 a power interface configured to receive power from an external power source.

5. The track module of claim 4, comprising:
a second plurality of communication connectors configured to communicatively couple the communication interface and the external device; and
a power connection component configured to electrically couple the power interface to the external power source.

6. The track module of claim 5, wherein the plurality of communication connectors and the plurality of power connectors are disposed on a first side of the track connection module and the second plurality of communication connectors and the power connection component are disposed on a second side of the track connection module.

7. The track module of claim 4, comprising a plurality of communication components, wherein each communication component is communicatively coupled to a corresponding communication connector of the plurality of communication connectors and wherein each communication component is communicatively coupled to an additional communication component of the plurality of communication components via a backplane link.

8. The track module of claim 7, wherein the backplane link is isolated from the communication interface.

9. The track module of claim 7, wherein the backplane link is communicatively coupled to the circuitry.

10. The track module of claim 1, wherein each communication connector of the plurality of communication connectors comprises a male connector configured to engage at least a portion of a corresponding female connector of the corresponding track section.

11. The track module of claim 4, comprising an indicator configured to provide an indication associated with a connection status of the communication interface.

12. A track section, comprising:
a plurality of coils configured to create a controlled magnetic field to enable a mover to traverse the track section;
a plurality of communication connectors disposed in corresponding apertures of the track section, wherein each communication connector is configured to transfer data between the track section and a corresponding track module;
a plurality of switches, wherein each switch is configured to receive data from a corresponding track module via a corresponding communication connector;
drive circuitry communicatively coupled to the plurality of switches, wherein the drive circuitry is configured to:
receive the data via the plurality of switches;
generate one or more power signals based on the data; and
transmit the one or more power signals to a plurality of coils within the track section, wherein the plurality of coils is configured to [tie to mover on track].

13. The track section of claim 12, wherein each communication connector of the plurality of communication connectors comprises a female connector configured to receive at least a portion of a corresponding male connector of a corresponding track module.

14. The track section of claim 12, comprising a power connector disposed in a corresponding aperture of the track section, wherein the power connector is configured to receive power from a corresponding track connection module.

15. The track section of claim 14, wherein the power connector comprises a female connector configured to receive at least a portion of a corresponding male connector of a corresponding track module.

16. A track module, comprising:
a first communication connector disposed on a first side of the track module, the first communication connector configured to communicatively couple to a first track section and configured to transfer data between the first track section and the track module;
a second communication connector disposed on the first side of the track module, the second communication connector configured to communicatively couple to a second track section and configured to transfer data between the second track section and the track module, wherein the first track section and the second track section are configured to enable a mover to traverse a track formed by the first track section and the second track section via one or more electromagnetic forces;
a first power connector disposed on the first side of the track module, the first power connector configured to electrically couple to the first track section and configured to transfer power between the first track section and the track module; and
a second power connector disposed on the first side of the track module, the second power connector configured to electrically couple to the second track section and configured to transfer power between the second track section and the track module.

17. The track module of claim 16, comprising a power interface configured to receive power from a power source, wherein the first power connector is configured to transfer power between the power interface and the first track section.

18. The track module of claim 16, wherein the first communication connector and the first power connector and configured to physically couple the track module and the first track section.

19. The track module of claim 16, wherein the second communication connector and the second power connector are configured to physically couple the track module and the second track section.

20. The track module of claim 16, wherein the first communication connector and the second communication connector are positioned between the first power connector and the second power connector.

* * * * *